United States Patent
Dubey et al.

(10) Patent No.: US 10,237,123 B2
(45) Date of Patent: Mar. 19, 2019

(54) DYNAMIC RECOVERY FROM A SPLIT-BRAIN FAILURE IN EDGE NODES

(71) Applicant: Nicira, Inc., Palo Alto, CA (US)

(72) Inventors: Ankur Dubey, Santa Clara, CA (US); Ganesan Chandrashekhar, Campbell, CA (US); Sreeram Ravinoothala, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/387,549

(22) Filed: Dec. 21, 2016

(65) Prior Publication Data

US 2018/0176073 A1  Jun. 21, 2018

(51) Int. Cl.
*H04L 12/24* (2006.01)
*H04L 29/14* (2006.01)
(Continued)

(52) U.S. Cl.
CPC ...... *H04L 41/0668* (2013.01); *G06F 11/1484* (2013.01); *G06F 11/202* (2013.01);
(Continued)

(58) Field of Classification Search
CPC ............. H04L 41/0668; H04L 12/4641; H04L 5/0055; H04L 69/325; H04L 69/40;
(Continued)

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| EP | 1653688 A1 | 5/2006 |
| EP | 2849395 A1 | 3/2015 |

(Continued)

OTHER PUBLICATIONS

Lin, Pingping, et al., "Seamless Interworking of SDN and IP," SIGCOMM '13, Aug. 12-16, 2013, 2 pages, ACM, New York, USA.
(Continued)

*Primary Examiner* — Kwang B Yao
*Assistant Examiner* — Moo Jeong
(74) *Attorney, Agent, or Firm* — Adeli LLP

(57) ABSTRACT

Some embodiments provide a method for employing the management and control system of a network to dynamically recover from a split-brain condition in the edge nodes of the network. The method of some embodiments takes a corrective action to automatically recover from a split-brain failure occurred at a pair of high availability (HA) edge nodes of the network. The HA edge nodes include an active machine and a standby machine. The active edge node actively passes through the network traffic (e.g., north-south traffic for a logical network), while the standby edge node is synchronized and ready to transition to the active state, should a failure occur. Both HA nodes share the same configuration settings and only one is active until a path, link, or system failure occurs. The active edge node also provides stateful services (e.g., stateful firewall, load balancing, etc.) to the data compute nodes of the network.

20 Claims, 10 Drawing Sheets

(51) Int. Cl.
*H04L 12/703* (2013.01)
*G06F 11/20* (2006.01)
*G06F 11/14* (2006.01)
*H04L 5/00* (2006.01)
*H04L 29/08* (2006.01)

(52) U.S. Cl.
CPC ...... *G06F 11/2025* (2013.01); *G06F 11/2028* (2013.01); *G06F 11/2033* (2013.01); *H04L 45/28* (2013.01); *H04L 69/40* (2013.01); *H04L 5/0055* (2013.01); *H04L 69/325* (2013.01)

(58) Field of Classification Search
CPC .. H04L 45/28; G06F 11/2033; G06F 11/2025; G06F 11/1484; G06F 11/2028; G06F 11/202
See application file for complete search history.

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,754,220 B1 | 6/2004 | Lamberton et al. |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,152,179 B1 | 12/2006 | Critchfield |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,428,220 B1 | 9/2008 | Caronni et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,519,734 B1 | 4/2009 | Dumitriu et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,647,426 B2 | 1/2010 | Patel et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,014,278 B1 | 9/2011 | Subramanian et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,218,454 B2 | 7/2012 | Hajiaghayi et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,762,507 B1 | 6/2014 | Ingram et al. |
| 8,958,298 B2 | 2/2015 | Zhang et al. |
| 8,997,094 B2 | 3/2015 | Bosch et al. |
| 9,059,999 B2 | 6/2015 | Koponen et al. |
| 9,203,703 B2 | 12/2015 | Koponen et al. |
| 9,225,597 B2 | 12/2015 | Tubaltsev et al. |
| 9,270,581 B2 | 2/2016 | Guellal et al. |
| 9,503,371 B2 | 11/2016 | Thakkar et al. |
| 9,577,845 B2 | 2/2017 | Thakkar et al. |
| 9,590,901 B2 | 3/2017 | Tubaltsev et al. |
| 9,762,537 B1 | 9/2017 | Eyada |
| 10,003,534 B2 | 6/2018 | Thakkar et al. |
| 10,038,628 B2 | 7/2018 | Ravinoothala et al. |
| 2001/0043614 A1 | 11/2001 | Viswanadham et al. |
| 2002/0093952 A1 | 7/2002 | Gonda |
| 2002/0095498 A1 | 7/2002 | Chanda et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056317 A1 | 3/2006 | Manning et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0198321 A1 | 9/2006 | Nadeau et al. |
| 2006/0239271 A1 | 10/2006 | Khasnabish et al. |
| 2006/0291388 A1 | 12/2006 | Amdahl et al. |
| 2007/0028244 A1 | 2/2007 | Landis et al. |

(56) References Cited

U.S. PATENT DOCUMENTS

| | | |
|---|---|---|
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0140235 A1 | 6/2007 | Aysan et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0031263 A1 | 2/2008 | Ervin et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1 | 10/2009 | Yan et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0046532 A1 | 2/2010 | Okita |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0149992 A1* | 6/2010 | Tan .................. H04L 45/02 370/242 |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0241767 A1 | 9/2010 | Corry et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0069634 A1 | 3/2011 | Hajiaghayi et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299386 A1 | 12/2011 | Negoto et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0083693 A1 | 4/2013 | Himura et al. |
| 2013/0121209 A1 | 5/2013 | Padmanabhan et al. |
| 2013/0125120 A1 | 5/2013 | Zhang et al. |
| 2013/0132536 A1 | 5/2013 | Zhang et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0250951 A1 | 9/2013 | Koganti |
| 2013/0254599 A1* | 9/2013 | Katkar ............... H04L 43/0811 714/57 |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0050218 A1 | 2/2014 | Kamble et al. |
| 2014/0056125 A1 | 2/2014 | Guellal et al. |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0341226 A1 | 11/2014 | Okita |
| 2014/0372582 A1 | 12/2014 | Ghanwani et al. |
| 2015/0009831 A1 | 1/2015 | Graf |
| 2015/0010009 A1 | 1/2015 | Takahashi et al. |
| 2015/0063360 A1 | 3/2015 | Thakkar et al. |
| 2015/0244628 A1 | 8/2015 | Gredler et al. |
| 2015/0263899 A1 | 9/2015 | Tubaltsev et al. |
| 2015/0263946 A1 | 9/2015 | Tubaltsev et al. |
| 2015/0271011 A1 | 9/2015 | Neginhal et al. |
| 2015/0309901 A1* | 10/2015 | Pershin .............. G06F 3/06 714/6.3 |
| 2015/0372943 A1 | 12/2015 | Hasan et al. |
| 2016/0080483 A1 | 3/2016 | Li et al. |
| 2016/0173415 A1 | 6/2016 | Wang et al. |
| 2016/0205196 A1 | 7/2016 | Hasan et al. |
| 2016/0248703 A1 | 8/2016 | Gopalakrishnan et al. |
| 2016/0294612 A1 | 10/2016 | Ravinoothala et al. |
| 2016/0301603 A1 | 10/2016 | Park et al. |
| 2017/0005915 A1* | 1/2017 | Mirsky ............... H04L 45/26 |
| 2017/0118067 A1 | 4/2017 | Vedula |
| 2017/0126493 A1 | 5/2017 | Zhang et al. |
| 2017/0139789 A1* | 5/2017 | Fries ................. G06F 11/203 |
| 2017/0142012 A1 | 5/2017 | Thakkar et al. |
| 2017/0163532 A1 | 6/2017 | Tubaltsev et al. |
| 2017/0317954 A1 | 11/2017 | Masurekar et al. |

(56) References Cited

U.S. PATENT DOCUMENTS

2017/0317971 A1 11/2017 Dubey et al.
2018/0006880 A1 1/2018 Shakimov et al.
2018/0183667 A1 6/2018 Dubey et al.

FOREIGN PATENT DOCUMENTS

| EP | 3117561 A2 | 1/2017 |
|----|------------|--------|
| EP | 3281367 A1 | 2/2018 |
| GB | 2419703 | 5/2006 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | WO 2013/113265 | 8/2013 |
| WO | 2015138043 A2 | 9/2015 |
| WO | WO 2015/142404 | 9/2015 |
| WO | 2016164277 A1 | 10/2016 |

OTHER PUBLICATIONS

Mechtri, Marouen, et al., "Inter and Intra Cloud Networking Gateway as a Service," 2013 IEEE $2^{nd}$ International Conference on Cloud Networking (ClouNet), Nov. 11, 2013, 8 pages, IEEE.

Caesar, Matthew, et al., "Design and Implementation of a Routing Control Platform," NSDI '05: 2nd Symposium on Networked Systems Design & Implementation , Apr. 2005, 14 pages, Usenix Association.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Maltz, David A., et al., "Routing Design in Operational Networks: A Look from the Inside," SIGCOMM '04, Aug. 30-Sep. 3, 2004, 14 pages, ACM, Portland, Oregon, USA.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

* cited by examiner

DYNAMIC RECOVERY FROM A SPLIT-BRAIN FAILURE IN EDGE NODES

BACKGROUND

In virtual networking, edge nodes handle the north-south traffic of one or more logical networks. In a multitenant datacenter, a logical network provides networking services to end machines (e.g., physical and virtual machines) of a tenant. An edge node can be a machine (physical or virtual machine) that connects a logical network to external networks (physical and/or logical networks). For providing high availability, some networks deploy a pair of active and standby edge appliances (e.g., gateways). High Availability (HA) ensures that the services provided by edge appliances are available even when a hardware or software failure renders a single appliance unavailable. One of the edges functions in active mode (i.e. actively forwards traffic and provides other logical network services), whereas the second edge node is in a standby state, waiting to take over should the active edge node fail. The active appliance maintains a heartbeat with the standby appliance and sends service updates through one or more internal interfaces (also referred to as HA interfaces).

When the active edge node is up and healthy but the two edge nodes cannot communicate with each other properly (e.g., a heartbeat is not received from the active edge node within a specified time), the standby edge node also declares itself as an active node. This scenario is known as split-brain. A split-brain can be a source of network disruption. For instance, the end virtual machines which require edge services (e.g., north bound routing, stateful services) might get the MAC address of either of the edge nodes (whichever responds first to an ARP request) since both edge nodes declared themselves as active nodes. As another example, when the edge nodes provide DHCP services, if both edge nodes are active and do not coordinate with each other, each edge node provides IP addresses to end machines that request for such independent of the other edge node. This could cause overlap in IP address assignments to the end machines (i.e., two end machines of the same network may have the same IP address). Typically, the edge nodes should be rebooted to resolve a split-brain failure.

BRIEF SUMMARY

Some embodiments provide a method for employing the management and control system of a network to dynamically recover from a split-brain condition in the edge nodes of the network. The method of some embodiments takes a corrective action to automatically recover from a split-brain failure occurred at a pair of high availability (HA) edge nodes of the network. The HA edge nodes (also referred to as HA peers hereinafter) include an active (or primary) machine and a standby (or secondary) machine. The active HA peer actively passes through the network traffic (e.g., north-south traffic for a logical network), while the standby HA peer is synchronized and ready to transition to the active state, should a failure occur. Both of the HA peers share the same configuration settings and only one is active until a path, link, or system failure occurs. The active peer also provides stateful services (e.g., stateful firewall, load balancing, etc.) to the data compute nodes (DCNs) of the network in some embodiments.

The dynamic corrective action, in some embodiments, is taken by the management and control system, while in some other embodiments the corrective action takes place at the edge nodes themselves. When the management plane (MP) and/or central control plane (CCP) of the network actively resolve a split-brain failure, the MP/CCP specifies which edge node should be the active peer and which edge node should be the standby peer. On the other hand, when the edge nodes actively resolve a split-brain condition, the MP/CCP only passes its view of the HA peers (i.e., the state of the peers) to the edge nodes. Each of the edge nodes then decides to be in an active state or a standby state.

In some embodiments, the MP and CCP are implemented in cluster formats. That is, a set of machines are clustered together to implement each of the MP and CCP. For example, a CCP cluster may include three controller machines that together implement the central control plane of a network (e.g., a logical network of a tenant of a datacenter). When the MP and CCP are clustered, the HA peers have a greater chance of retaining their connectivity with the MP/CCP clusters even when they lose the connection with each other (e.g., in a split-brain situation).

In some embodiments, the CCP cluster receives the states of the HA peers when there is a change in the states (even when the HA peers shut down). For instance, when an HA peer's state changes from active to standby, the HA peer sends a message to the CCP cluster informing the controllers of such a change. Additionally, the CCP cluster receives a message from the HA peers when these peers are unable to communicate with each other. Although in the described embodiments a CCP cluster is described as a cluster that communicates with the edge nodes for determining the states of the edge nodes, in some other embodiments, instead of, or in conjunction with the CCP cluster, an MP cluster can be employed by the network to recover from a split-brain failure.

When the CCP cluster of some embodiments realizes that both of the HA peers are in active states (e.g., from the received state changes) and that HA connection is lost (e.g., from the received HA connection status), the CCP cluster starts a correction timer. The correction timer can be set by a user (e.g., a network administrator) in some embodiments. In some embodiments, when the correction timer expires and the split-brain situation is still not resolved (e.g., through further state transitions of the HA peers), the CCP cluster issues a command to one of the edge nodes (e.g., the less preferred edge node) to change its state from active to standby.

The edge node that receives the "standby" command from the CCP cluster immediately transitions to a standby state in some embodiments. In some other embodiments, the HA peer that receives the "standby" command checks for connectivity with the other HA peer one last time before moving to standby state. In some such embodiments, if this last time checking shows that the HA peers are reconnected, the HA peer that receives the "standby" command simply ignores the command and starts negotiating with the other peer to decide which HA peer should be primary and which one should be secondary. In some embodiments, when the standby peer resumes communication with the other peer and the other peer is in an active state, the standby peer stays in the standby state. However, if for any reason the other peer is in a standby state, in some embodiments, a predetermined priority (e.g., set by the CCP cluster) would determine which HA peer should be active and which HA peer should be standby.

As stated above, in some embodiments, instead of the CCP cluster, the HA peers take the corrective action themselves. However, similar to the embodiments in which the CCP cluster takes the corrective action, the CCP cluster in these embodiments is employed too to pass the states of the edge nodes (and the CCP cluster) to the edge nodes. That is, the edge nodes send their states and/or HA connection status to the CCP cluster each time their state and/or HA connection status changes. However, unlike the embodiments in which the CCP cluster takes the corrective action, here the CCP cluster does not evaluate the status of the edge nodes, nor does the CCP cluster send a "standby" command to the less preferred edge node. Instead, upon receiving a state transition, the CCP cluster records and forwards the HA states to the edge nodes. In some embodiments, in addition to the states of the edge nodes, the CCP cluster sends its majority cluster status to the edge node from which it has received a state transition message.

The majority cluster status informs the edge nodes whether the majority of the controllers in the CCP cluster, to which the edge nodes are connected, are healthy and active or not (if the CCP cluster is partitioned then the edge node should be connected to the majority of the nodes in the partition). In this approach, when an HA peer receives the majority state acknowledgement from the CCP cluster, the HA peer changes its state based on the state of the other peer. That is, if the other peer's state is active, the HA peer transitions into a standby state and if the other peer's state is standby, the HA peer transitions into an active state. On the other hand, if the edge node does not receive a majority state acknowledgment back from the CCP cluster (within a specified period), or if the received status from the CCP cluster shows the CCP cluster as a minority cluster, in some embodiments, the edge node steps down from an active state if it is in that state. As a result of this approach, when both edge nodes lose connectivity to the CCP cluster (or the majority of controllers in the CCP cluster), the edge nodes transition into standby states.

In some other embodiments both of the edge nodes can be disconnected from each other and from the CCP cluster as long as the edge nodes are healthy and in active states. This is because in these embodiments, it is more desirable to have two healthy and active edge nodes (that are disconnected from each other) than to have both edge nodes in standby states and not providing any edge node services. In some such embodiments, the edge nodes are not required to receive a majority cluster status acknowledgement from the CCP cluster. In other words, when each of the edge nodes are not connected to any other node (the HA peer or a controller), the edge node moves into an active state in order to provide at least some of the edge services (e.g., routing, stateful services, etc.).

In some embodiments, as long as an HA peer is connected to a controller in the CCP cluster, the HA peer checks for the connectivity status of the other peer to the CCP cluster. When the other peer is not connected to the CCP cluster the HA peer transitions into an active state (if not in that state already). Additionally, when an HA peer is not connected to any other node (i.e., neither a controller in the CCP cluster, nor the other HA peer), the HA peer changes its state to an active state. As a result of this approach, when both of the HA peers are not connected to any other node, they become active edge nodes.

Some embodiments, in addition to taking the corrective action during a split-brain failure, take additional preventive actions to avoid a split-brain scenario or to reduce the possibility of a split-brain condition beforehand. In order to do so, some such embodiments increase the number of HA interfaces (i.e., the links between the HA peers to communicate and to detect liveliness of the other peer) when an HA pair is initialized (e.g., when a pair of virtual edge machines are instantiated). Alternatively, or conjunctively, some embodiments make the number of HA interfaces for an HA pair configurable by a user (e.g., by a network administrator). This way, a user can set up an initial number for the interfaces and later modify the number of links based on the network's requirements.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1A:
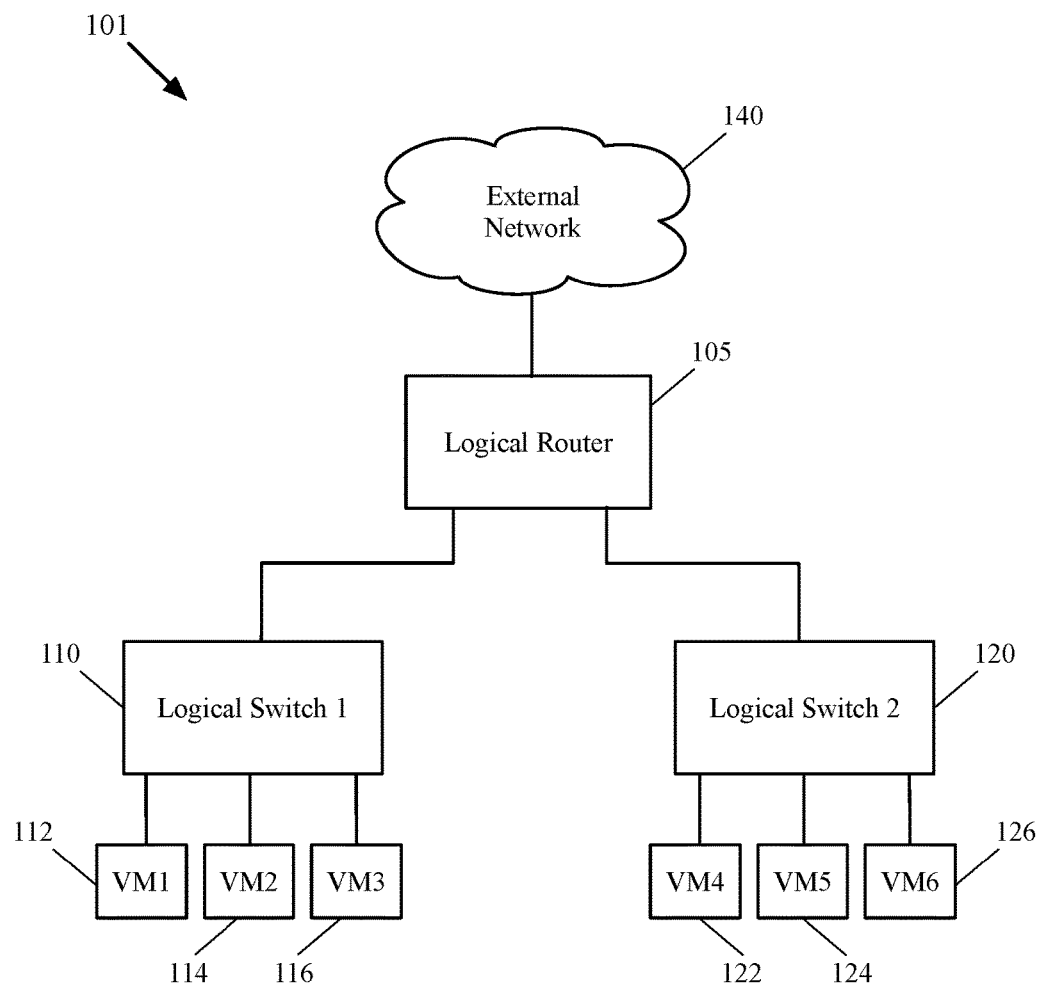
FIGS. 1A-1B illustrate a logical network topology that includes several network elements and a physical network that implements the illustrated logical network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for employing the management and control system of a network to resolve a split-brain problem in the edge nodes of the network. The method of some embodiments takes a dynamic corrective action to automatically recover from a split-brain failure occurred at a pair of high availability (HA) edge nodes of the network. The HA edge nodes (also referred to as HA) include an active (or primary) node (e.g., a primary virtual machine) and a standby (or secondary) node (e.g., a secondary virtual machine).

The active HA peer actively passes through the network traffic (e.g., north-south traffic for a logical network), while the standby HA peer is synchronized and ready to transition to the active state, should a failure occur. In this configuration, both HA peers share the same configuration settings and one is active until a path, link, system, or network failure occurs. The active peer also provides stateful services (e.g., stateful firewall, load balancing, etc.) to the end machines of the network in some embodiments.

In some embodiments when an edge node is declared as a high availability edge node (e.g., when an HA option is enabled for an edge node), a second edge node is dynamically configured to act as a standby edge node for the active edge node. The HA peers have a mechanism (e.g., a heartbeat message, a Bidirectional Forwarding Detection (BFD) message) to detect liveliness between the HA peers. If the two nodes are able to communicate with each other (e.g., through one or more private network links that are established between the edge nodes), one edge node will elect itself as an active node and the other one elects itself as a standby node based on predetermined priority. The predetermined priority of edge nodes, in some embodiments, is decided by the management and control system of the network when deploying the edge nodes as the HA peers of the network. In some embodiments, this predetermined priority can be modified or overwritten by a user (e.g., through a one or more application programming interface (API) calls).

The heartbeat message, in some embodiments, is an Internet Control Message Protocol (ICMP) message that each peer sends to the other peer at certain intervals. The message verifies network connectivity with the other HA peer. In some embodiments, when a destination peer identifies a lack of heartbeat messages during an anticipated arrival period, the destination peer determines that the originator peer has failed, shutdown, or is generally no longer available. When no heart beat received from an originator peer (e.g., when all of the private links between the peers go down simultaneously), but the HA peers are still running, each one of the HA peers believes that it is the only peer running an as such transitions to an active state.

Some embodiments, in addition to taking corrective action during a split-brain failure, take additional preventive actions to avoid a split-brain scenario or to reduce the possibility of a split-brain condition beforehand. In order to do so, some such embodiments increase the number of HA interfaces (i.e., the links between the HA peers to communicate and to detect liveliness of the other peer) when an HA pair is initialized (e.g., when a pair of virtual edge machines are instantiated). Alternatively, or conjunctively, some embodiments make the number of HA interfaces for an HA pair configurable by a user (e.g., by a network administrator). This way, a user can set up an initial number for the interfaces and later modify the number of links based on the network's requirements.

As stated above, the pair of high availability edge nodes, in some embodiments, includes a pair of gateway machines at the edge of the network that provide edge services to the data compute nodes (DCNs) of the network (e.g., to the virtual and physical machines of a network). The edge services provided by the edge nodes include, but is not limited to, layer three routing of network data (e.g., towards or from one or more end machines in one or more external networks) and stateful services (e.g., DHCP, firewall, NAT, load balancing, etc.) on the network traffic.

The edge nodes of some embodiments can be physical machines or any other type of a data compute node such as a virtual machine (VM), a container, etc., that instantiates and executes on another machine (e.g., an edge host machine). Additionally, the end machines of a logical network can also be physical machines or any other type of DCNs that executes on one or more host machines of a hosting system (e.g., a datacenter). These end machines are logically connected to each other and to other end machines of other networks (logical and/or physical networks) through a set of logical forwarding elements of the logical network.

The set of logical forwarding elements is implemented by one or more managed forwarding elements that operate (executes) on each host machine in some embodiments. A managed forwarding element, operates in a virtualization software (e.g., a hypervisor) of a host machine. The set of logical forwarding elements is also implemented by one or more managed hardware forwarding elements (e.g., a hardware top of rack (TOR) switch) through physical ports of which, a set of physical machines (e.g., physical servers) logically connects to the logical network.

A logical network, in some embodiments, in addition to several different L2 and L3 logical forwarding elements (e.g., logical switches and logical routers), includes other logical network elements (e.g., logical firewall, logical load balancer, etc.) that are placed on different logical paths of the logical network. Through these logical network elements, several different DCNs that run on different host machines connect to each other, to other physical machines of the logical network (e.g., physical machines connected to managed hardware forwarding element such as TOR switches, hardware routers, etc.), and to other end machines of other networks.

In some embodiments, a user defines a logical network topology (i.e., defines the logical network elements and the connections between these elements) for a logical network through a management plane of the logical network. The management plane of a logical network, in some embodiments, includes one or more manager machines (or manager applications) through which the different logical network elements are defined (e.g., through API calls, user interfaces). The management plane pushes the network elements' data to the control plane of the logical network (e.g., one or more controller computers (or applications) that control the data exchange between the managed forwarding elements in the logical network).

The management and control planes push the configuration data to a set of physical nodes (e.g., host machines, gateway machines, etc.) in order to configure the physical nodes to implement the logical network (i.e., to implement the logical network elements of the logical network). The configuration and forwarding data that is distributed to the physical nodes defines common forwarding behaviors of the managed forwarding elements (MFEs) that operate on the physical nodes in order to implement the logical forwarding elements (LFEs). The configuration data also configures the virtualization software of the host machines to implement other logical network elements (e.g., to instantiate a distributed firewall instance on each hypervisor that implements the logical firewall). In some embodiments, a local controller that operates on each physical node (e.g., in the hypervisor of a host machine) receives the configuration and forwarding data from the CCP cluster first.

The local controller then generates customized configuration and forwarding data that, for example, defines specific forwarding behavior of an MFE that operates on the same host machine on which the local controller operates and distributes the customized data to the MFE. The MFE implements the set of logical forwarding elements based on the configuration and forwarding data received from the local controller. Each MFE can be connected to several different DCNs, different subsets of which may belong to different logical networks (e.g., for different tenants). As such, the MFE is capable of implementing different sets of logical forwarding elements for different logical networks.

Figure 1B:
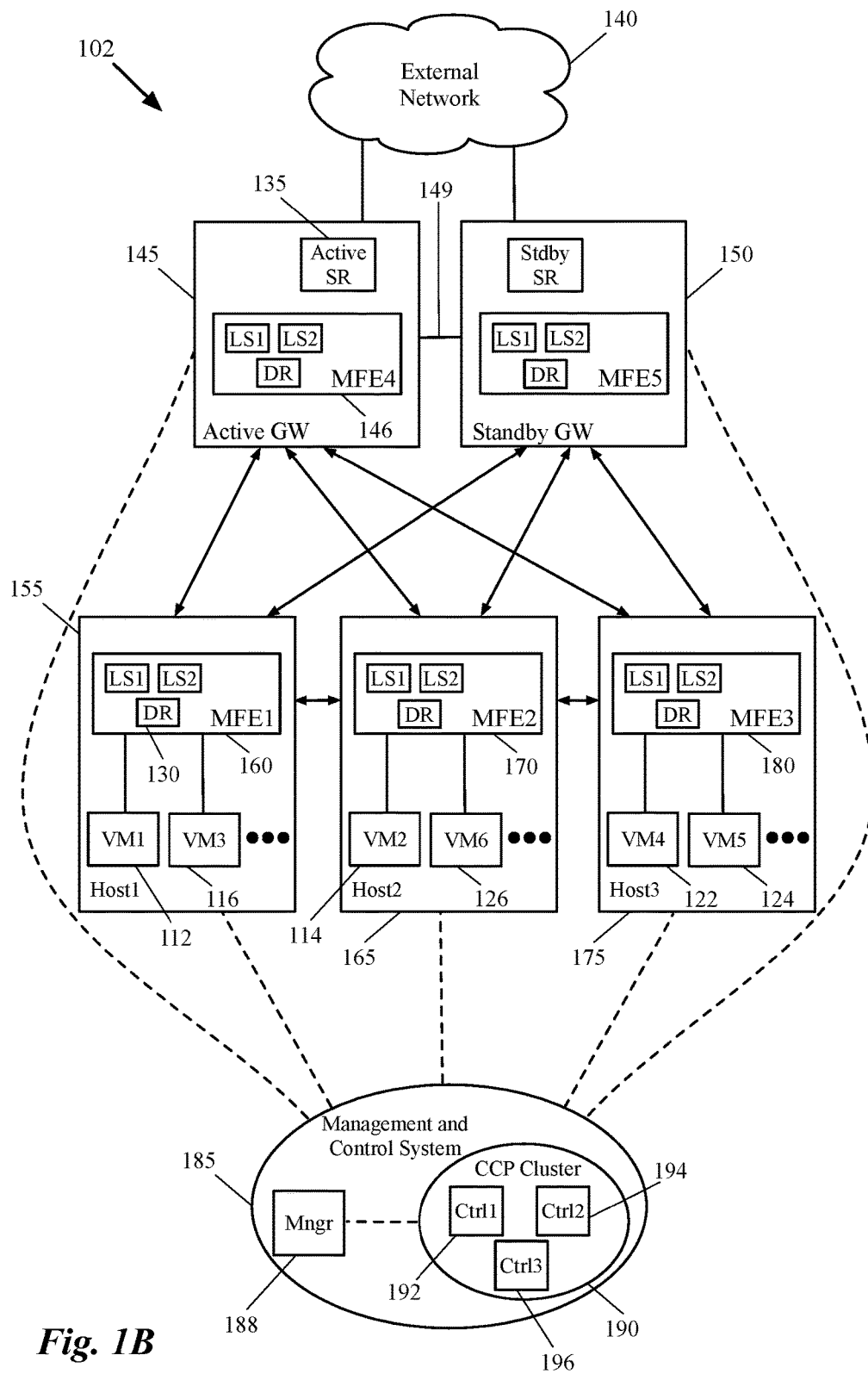

FIGS. 1A-1B illustrate a logical network topology that includes several network elements and a physical network that implements the illustrated logical network. More specifically, FIG. 1A illustrates a logical network 101 that includes a logical router 105, two logical switches 110 and 120, and an external network 140. The logical network 101 can be an overlay network (e.g., defined for a tenant of a datacenter) that is implemented by a physical network infrastructure (e.g., a physical network of a datacenter).

The logical router 105 connects the logical switches 110 and 120 to each other and to the external network 140. The logical switch 110 logically connects the VMs 112-116 to each other and to the logical network 101, while the logical switch 120 logically connects the VMs 122-126 to each other and to the logical network 101. Through these logical network forwarding elements, the VMs 112-116 and VMs 122-126 communicate with each other and with other end machines in the external network 140. As described above, each of these logical network elements can be defined (e.g., through a set of API calls) by a user (e.g., a datacenter network administrator, a tenant, etc.).

It should be understood that the number of logical network elements illustrated in the figure is limited in order to simplify the description. Otherwise, a logical network may have many more logical network elements such as additional logical forwarding elements and/or logical middleboxes (e.g., logical firewalls, logical DHCP servers, logical load balancers, etc.). Conversely, a logical network may include a single logical network element (e.g., a logical switch) that logically connects several different machines (physical or virtual) to the logical network. Similarly, the number of demonstrated virtual machines is exemplary. A real logical network may connect hundreds or even thousands of virtual and physical machines together and to other networks.

FIG. 1B illustrates the physical implementation of the logical forwarding elements illustrated in FIG. 1A. More specifically, this figure shows how the physical nodes of the physical network architecture 102 are configured by the management and control system 185 to implement the logical switches and router of the logical network architecture 101 shown in FIG. 1A. The physical nodes shown in this figure include two gateway machines 145 and 150, and three host machines 155, 165, and 175. The management and control system 185 also includes a manager 188 and a central control plane (CCP) cluster 190 which includes three controller machines 192-196. The figure also shows that the two gateway machines 110 and 120 are connected to the external network 140 (e.g., through physical routers).

Although shown as a single manager 188, the management plane (MP) of some embodiments is implemented by a cluster of manager machines (similar to the shown cluster of controller machines). That is, a set of machines are clustered together to implement each of the MP and CCP. Additionally, although in the illustrated example, the CCP cluster includes three controller machines that together implement the central control plane of the logical network, a CCP cluster and/or an MP cluster may include many more controller and/or manager machines. In some embodiments each controller is assigned a set of roles (e.g., providing APIs, managing L2 switches, etc.) that define the type of tasks the node can implement. In some embodiments, by default, each controller is assigned all roles. In some embodiments each controller in the cluster is a master of a particular task.

When the MP and CCP are clustered, the HA peers (i.e., gateway machines 145 and 150) have a greater chance of retaining their connectivity with the MP/CCP clusters even when they lose the connection with each other (e.g., in a split-brain situation). The dashed-lines between the management and control system and the other physical nodes (e.g., host machines and gateway servers) represent management and control channels, through which the management and control system distributes management and control data such as configuration data, and through which the management and control system receives runtime data from the other physical nodes.

Each of the illustrated physical nodes includes a managed forwarding element (MFE) that operates in the virtualization software of the physical node in some embodiments. More specifically, host machine 155 hosts the virtual machines 112 and 116, along a set of DCNs and executes MFE 160; host machine 165 hosts the virtual machines 114 and 126 (along a set of other DCNs) and executes MFE 170; and host machine 175 hosts the virtual machines 122 and 124 (as well as a set of other DCNs) and executes MFE 180.

Each MFE implements the LFEs of the logical network by performing the forwarding processing of the LFEs for the packets that are received from, or sent to the corresponding VMs that are connected to the MFE. For example, the first and third logical ports of the logical switch 110 shown in FIG. 1A are mapped to two physical (software) ports of MFE 160 that are coupled to VM1 and VM3, while the second logical port of this logical switch is mapped to a physical port of MFE 170 that is coupled to VM2. Conversely, a logical port of the logical switch 120 is also mapped to another physical port of MFE 160 that is coupled to the VM 116 (VM3). That is, as shown, each MFE is capable of implementing different logical switches of one or more logical networks.

The virtual machines of each host machine communicate (e.g., exchange network data) with each other, with the virtual machines executing on the other host machines, and with the external network via the MFEs that implement the LFEs of the logical network 101. In some embodiments, the MFEs perform the entire first-hop forwarding processing for the logical switches and routers on packets that are received from the virtual machines. As stated above, the MFEs residing on the host machines Host1-Host3 may also implement logical switches (and distributed logical routers) for other logical networks if the other logical networks have VMs that reside on the host machines Host1-Host3 as well.

In some embodiments, when an MFE executing in one of the host machines Host1-Host3 receives a packet from a VM that is coupled to the MFE, it performs the processing for the logical switch to which that VM is logically coupled, as well as the processing for any additional logical forwarding elements (e.g., processing for logical router 105 if the packet is sent to the external network 140, logical router processing and processing for the other logical switch if the packet is sent to a VM coupled to the other logical switch, etc.).

The management and control system 185 distributes the logical forwarding data of the LFEs (i.e., the logical L2 switches 110 and 120, and the logical L3 router 105) to the MFEs MFE1-MFE5 in order for the MFEs to implement these logical forwarding elements. Each of the manager 188 and controllers 192-196 can be a physical computing device (e.g., a server, a computer, etc.), a data compute node (DCN) such as a virtual machine (VM), a container, etc., or a software instance (or a process) operating on a physical computing device or DCN. In some embodiments, a manager includes different user interface applications for administration, configuration, monitoring, and troubleshooting one or more logical networks in the physical network infrastructure (e.g., a hosting system network).

The CCP cluster 190 controls the network data communication between the different DCNs of the logical network (e.g., between the VMs VM1-VM6 in the illustrated example) by controlling the data communication between the MFEs (MFE1-MFE5). The CCP cluster communicates with the MFEs in order to control the data exchange between the MFEs since the MFEs also implement virtual tunnel endpoints (VTEPs) that ultimately exchange the logical network data between the DCNs. For example, each MFE has a particular port with a unique IP address that acts as a VTEP.

In some embodiments, a local controller that operates in each hypervisor of the host machines (not shown) receives the configuration data for the logical network from the CCP cluster 190. The received configuration data might be general configuration data that is defined for all of the MFEs or a particular subset of MFEs. The local controller then converts and customizes the received logical network data for the local MFE that operates on the same host machine on which the local controller operates. The local controller then delivers the converted and customized data to the local MFE on each host machine.

For instance, the configuration data may specify the location (e.g., IP address) of each MFE as a tunnel endpoint (i.e., a software VTEP or a hardware VTEP in case of a TOR switch). The different MFEs receive the tunnel endpoint addresses of the other MFEs that implement the logical forwarding elements from the CCP cluster and store these addresses in the MFEs' corresponding VTEP tables. The MFEs then use these VTEP tables to establish tunnels between each other. For example, in an east-west network communication, a source VTEP uses its corresponding VTEP table data to encapsulate the packets received form a source VM. The source VTEP encapsulates the packets using a particular tunnel protocol (e.g., VXLAN protocol), and forwards the packets towards the destination VTEP. The destination VTEP then decapsulates the packets using the same particular tunnel protocol and forwards the packets towards a destination VM.

In some embodiments, when a logical router is defined for a network, the management and control system generates one distributed routing component (also referred to as a distributed router or DR) and one or more service routing components (each of which is also referred to as a service router or SR). The distributed routing component (DR) is implemented in a distributed manner by numerous machines within the network (e.g., a hosting system network), while each service component (SR) is implemented by a single edge node. In addition, the management and control system defines a transit logical switch (TLS) for handling communications between the components internal to the logical router (i.e., between the distributed router and the service routers).

Each of these routing components is separately assigned a set of routes and a set of logical interfaces (ports). Each logical interface of each routing component is also assigned a network layer (e.g., Internet Protocol or IP) address and a data link layer (e.g., media access control or MAC) address. Some embodiments implement the DR of the logical router in a distributed manner across the different MFEs in a same manner that a logical L2 switch spans the different MFEs. Each service router (SR) has an uplink interface for communicating with an external network as well as a TLS interface for connecting to the transit logical switch and communicating the network data with the distributed routing component of the logical router that is also connected to the TLS.

The SRs of a logical router, in some embodiments, may be configured in active-active or active-standby mode. In active-active mode, all of the service components are fully functional at the same time, and traffic can ingress or egress from the logical network through the service components using equal-cost multi-path (ECMP) forwarding principles (balancing the traffic across the various service routing components). In this mode, each logical interface of each separate service component has unique IP and MAC addresses for communicating with an external network and/or with the distributed component (through the transit logical switch).

In the illustrated example, the logical router 105 of FIG. 1A, is defined to have a DR 130 that is being implemented by all of the five managed forwarding elements MFE1-5, along with the two logical switches LS1 and LS2. This figure also shows that the active gateway machine 145 is implementing an active SR 135 to connect to the external network while the standby gateway machine 150 is implementing a standby SR to substitute SR135 in a failover switching. The logical router, as described above, also includes a transit logical switch which is not shown in this figure.

In addition to configuring the MFEs to handle the east-west traffic (e.g., by implementing the logical switches and DR), the management and control system 190 generates and distributes configuration data to the gateway machines of an edge cluster (not shown) including the gateway machines 145 and 150 to connect the virtual machines VM1-VM6 to the external network 140 and to provide stateful services to these VMs. As stated above, the two gateway machines 145 and 150 connect the logical network 101 to the external network 140. However, in a normal situation, only the active edge node 145 handles the north-south traffic and provides stateful services. The standby edge node 150 takes over the edge service providing only when the active edge node becomes unavailable.

As shown, in addition to executing MFE 146, the active gateway machine 145 executes an instance (module) 135 to implement the service router of the logical router 105 to perform L3 routing for the north-south traffic. The figure shows that the DRs 130 are implemented by the MFEs of the physical nodes (e.g., host machines Host1-Host-3 and the edge nodes 145 and 150). The SR 135, on the other hand, is implemented by a module on edge nodes only. In some embodiments the edge nodes 145 and 150 are host machines that execute each of the SRs (and other stateful services modules such as firewall modules, NAT modules, etc.) as a DCN (e.g., a VM, a container, etc.). In some embodiments, the active edge node communicates with the standby edge node through one or more private links such as the link 149. These private links are used to exchange heartbeat/BFD messages as well as updated configuration and runtime data (e.g., flow tables, routing tables, etc.).

As an example, when virtual machine 112 (VM1) sends a northbound packet to the external network 140, the datapath on MFE 160 initially runs the source logical switch 110 pipeline (e.g., based on the ingress port through which the packet is received, the source MAC address, etc.). This pipeline specifies to forward the packet to the logical router 105 (i.e., to the DR 130 of the logical router), the pipeline for which also takes place on the source 160. This pipeline identifies a DR executing on the MFE146 in the gateway machine 145. In the active-standby case (as in the illustrated example), the pipeline identifies the active DR executing on the active gateway 145.

However, in an active-active scenario, some embodiments use equal-cost multi-path (ECMP) routing to select one of the active SRs. Next, the source MFE encapsulates the packet with the required data to send the packet to the active gateway machine (e.g., MFE 160 adds its own IP address to the outer packet header as the source VTEP and the IP address of the MFE 146 as the destination VTEP).

The gateway machine 145 receives the packet, decapsulates it (i.e., removes the tunneling data in the outer header of the packet), and sends the packet to the DR of the gateway machine the pipeline of which will send the packet the SR 135. The SR 135 pipeline is then executed (e.g., by a VM implementing the SR in some embodiments, by the gateway machine in other embodiments). The SR pipeline ultimately sends the packet to the physical external network. In some embodiments the SR's northbound interface is coupled to a physical router that receives the packet from the SR and distributes the packet towards its final destination in the external network.

One of ordinary skill in the art would realize that the number of the host machines, managers, controllers, edge nodes, and virtual machines illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments.

As described above, the corrective action, in some embodiments, is taken by the management and control system (e.g., the CCP cluster or the MP cluster), while in some other embodiments the corrective action takes place at the edge nodes themselves. When the MP and/or CCP cluster of the network actively resolve a split-brain failure, the MP/CCP cluster specifies which edge node should be the active peer and which each node should be the standby peer. On the other hand, when the edge nodes actively resolve a split-brain condition, the MP/CCP cluster only passes its view of the HA peers (i.e., the state of the peers) to the edge nodes. Each of the edge nodes then decides to be in an active state or a standby state.

General features of implementation of a logical network that is connected to an external network and how the edge nodes connect the logical network to the external network were described above. In the following, Section I describes the embodiments in which the corrective action to recover from a split-brain failure is taken by the MP/CCP cluster. Next, Section II describes the embodiments in which the corrective action is taken by the HA peers themselves to recover from a split-brain failure. Section III then describes the electronic system with which some embodiments of the invention are implemented.

I. MP/CCP Cluster Determines the HA States

In some embodiments, the CCP cluster receives the states of the HA peers when there is a change in the states (even when the HA peers shut down). For instance, when an HA peer's state changes from active to standby, the HA peer sends a message to the CCP cluster informing the controllers of such a change. Additionally, the CCP cluster receives a message from the HA peers when these peers are unable to communicate with each other.

It is important to note that even though in the embodiments described above and below, a CCP cluster is shown and described to be the cluster that communicates with the edge nodes for determining the states of the edge nodes, in some embodiments, instead of, or in conjunction with the CCP cluster, an MP cluster can be employed by the network (the same way that the CCP cluster is employed) to recover from a split-brain failure. In some embodiments, employing a CCP cluster or an MP cluster depends on the platform and architecture of the network and physical nodes. For example, in some embodiments, employing a CCP cluster or an MP cluster depends on whether or not the management and data traffic share the same physical network interface controllers (PNICs) of the edge nodes.

When the CCP cluster of some embodiments realizes that both of the HA peers are in active states (e.g., from the received state changes) and that all of the HA connections between the peers are lost (e.g., from the received HA connection status), the CCP cluster starts a correction timer. The correction timer can be set by a user (e.g., a network administrator) in some embodiments. In some embodiments, when the correction timer expires and the split-brain situation is still not resolved (e.g., through further state transitions of the HA peers), the CCP cluster issues a command to one of the edge nodes (e.g., the less preferred edge node) to change its state from active to standby.

The edge node that receives the "standby" command from the CCP cluster immediately transitions to a standby state in some embodiments. In some other embodiments, the HA peer that receives the "standby" command checks for connectivity with the other HA peer one last time before moving to standby state. In some such embodiments, if this last time checking shows that the HA peers are reconnected, the HA peer that receives the "standby" command simply ignores the command and starts negotiating with the other peer to decide which HA peer should be primary and which one should be secondary. In some embodiments, when the standby peer resumes communication with the other peer and the other peer is in an active state, the standby peer stays in the standby state. However, if for any reason the other peer is in a standby state, in some embodiments, a predetermined priority (e.g., set by the CCP cluster) would determine which HA peer should be active and which HA peer should be standby.

Figure 2A:
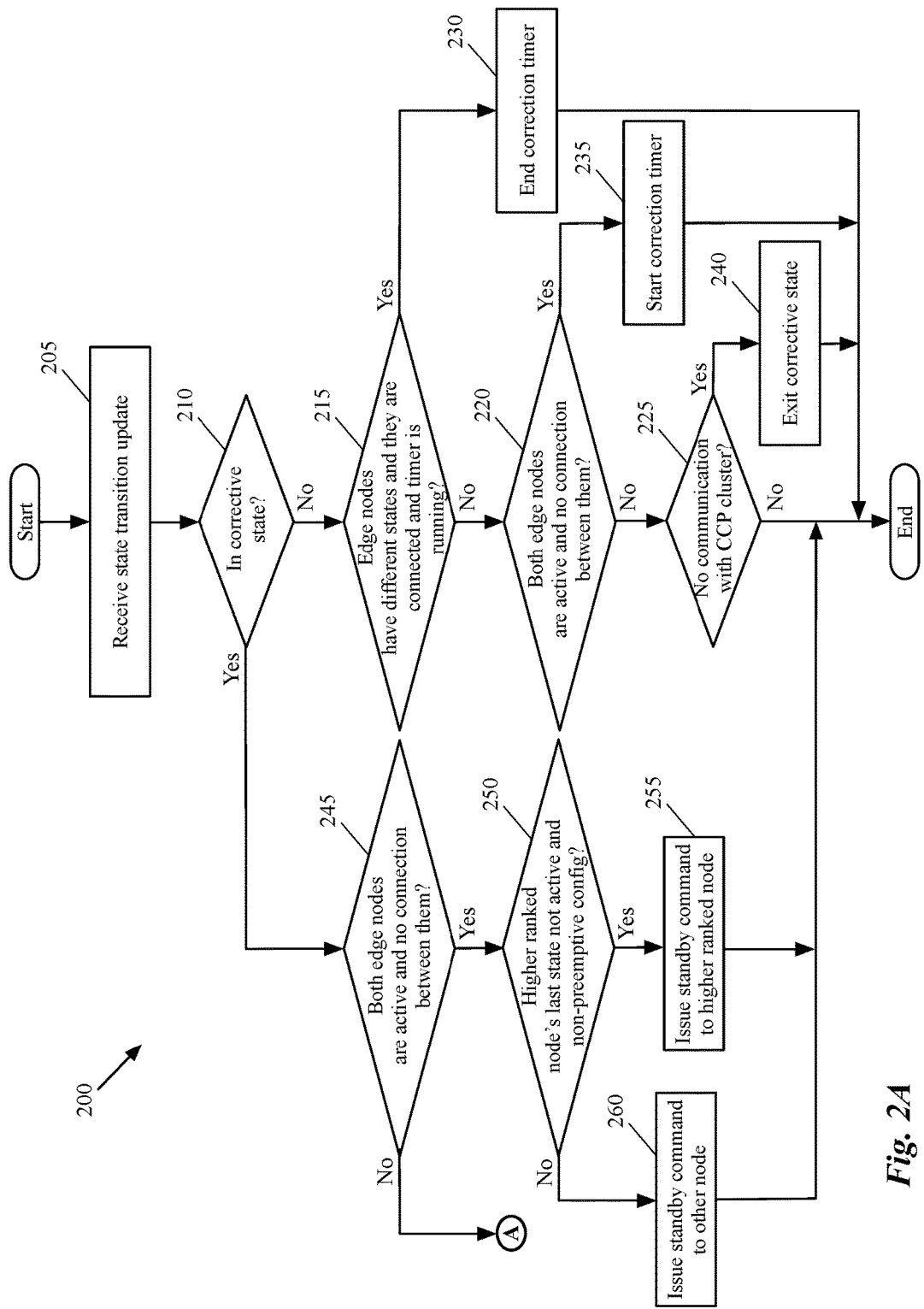
FIGS. 2A-2B conceptually illustrate a process of some embodiments for determining the active and standby states of a pair of high availability edge nodes during a split-brain failure.
Figure 2B:
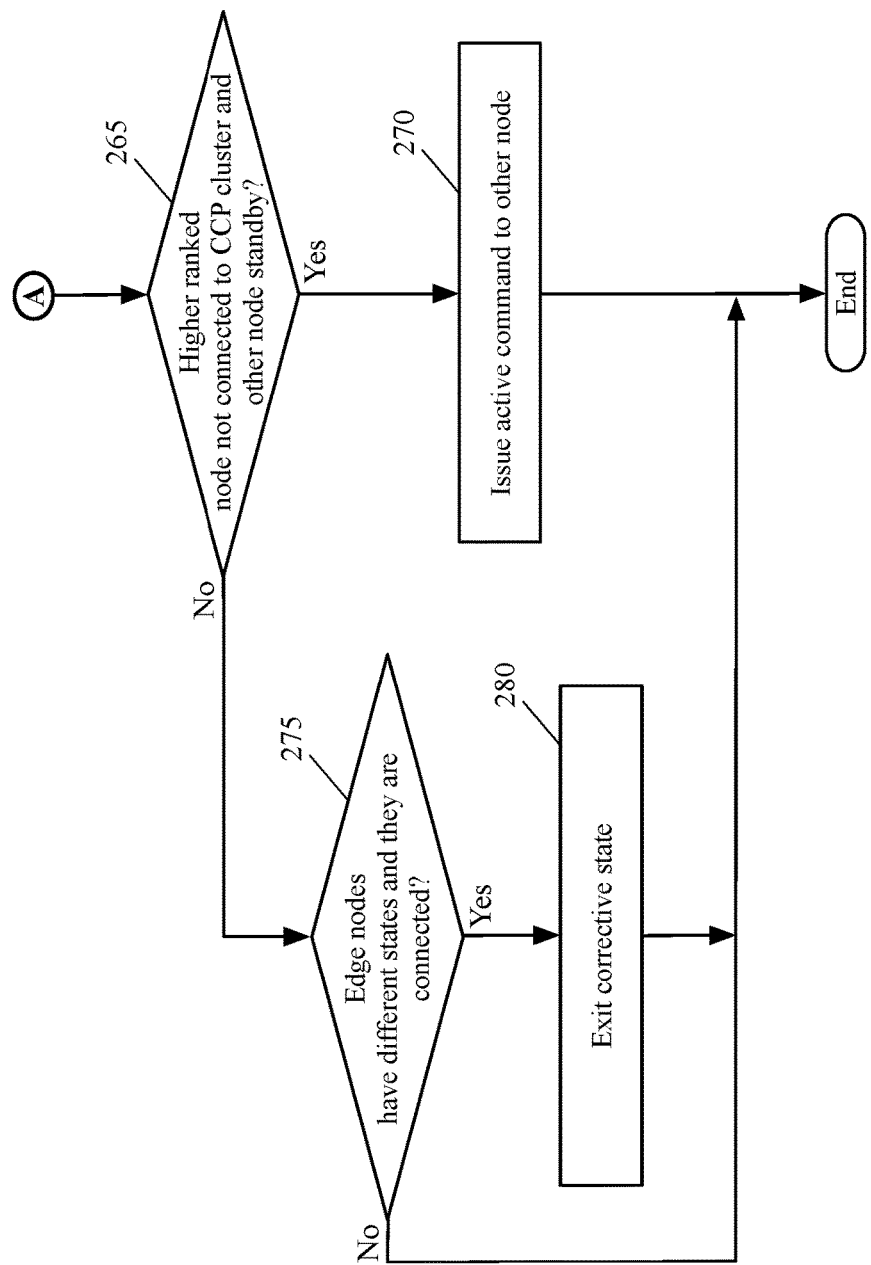

FIGS. 2A-2B conceptually illustrate a process 200 of some embodiments for determining the active and standby states of a pair of high availability edge nodes during a split-brain failure. The process 200 is performed by a CCP (or MP) cluster of the network in some embodiments. If the edge nodes are connected to each other, they can decide on which node should be active and which node should be standby even if they have lost connectivity to the CCP cluster. The process 200 is activated when the CCP cluster receives a state change and/or a change in connectivity state of any of the HA peers.

Process 200 starts, in FIG. 2A, by receiving (at 205) a state transition message or a connectivity state change from an edge node in a pair of HA edge nodes. The message informs the CCP cluster about the edge node transitioning from one state to another (e.g., from connected state to disconnected state, from standby state to active state, from available state to unavailable state, etc.). The process saves the states of the edge node (e.g., stores the states in a data storage) each time it receives a state change.

After the process receives the message, the process determines (at 210) whether the system is in a corrective state or not. As will be described in great detail below, when a pair of HA edge nodes get disconnected from each other and as a result they both declare themselves as active nodes, the system of some embodiments enters a corrective state. During this corrective state, the CCP cluster of some embodiments is in charge of assigning the proper states to the HA peers. When the process determines that the system is in a corrective state, the process proceeds to operation 245, which is described below.

However, when the process determines that the system is not in a corrective state, the process, based on the received message, determines (at 215) whether the edge nodes are connected to each other, have different states (i.e., one is active and the other one is standby), and correction timer is running. As will be described below, the correction timer is triggered whenever the CCP cluster is informed about a split-brain failure for the first time. When the process determines that the split-brain situation is already resolved (i.e., the edge nodes are in active/standby states and the connection between the edge nodes is not lost and the correction timer is running), the CCP cluster ends (at 230) a correction timer thread.

As described below by reference to FIG. 3, this thread, in some embodiments, is a recursive function that continuously (e.g., periodically) checks to see whether the correction timer is expired in order to issue a "standby" command to the less-preferred edge node and to set the state of the system to a corrective state. The following algorithm illustrates an HA correction timer thread. After ending the correction timer thread, the process ends.

On the other hand, when the process determines that at least one of the conditions in operation 215 is not satisfied, the process determines (at 220) whether both of the edge nodes are in active states and there is no connection between them. In some embodiments, the process should receive the lost connectivity status from both of the edge nodes in order to determine that the edge nodes are not connected. This is because, under a particular circumstance, a first HA peer may think that it is not connected to the second peer, while the second HA peer is still able to communicate with the first peer.

For example, the first peer sends a heartbeat/BFD message to the second peer but for a particular reason does not receive an acknowledgement back from the second peer, while the second peer does the same and receives an acknowledgement back from the first peer. As such, the process of some embodiments determines that the edge nodes are not communicating, when the process receives a lost connection status from both of the edge nodes.

When the process determines that both edge nodes are active and there is no communication between the edge nodes, the process realizes that the edge nodes are in a split-brain condition and a recovery from this condition is required. However, often the edge nodes recover from a split-brain condition within a short period of time and without receiving any help from the CCP cluster during the corrective state.

For example, the HA peers regain connection to each other quickly after losing their connection. Therefore, when the process realizes that the edge nodes are not connected and they both are active, the process of some embodiments starts (at 235) the correction timer (as stated, the correction timer function which uses the correction timer is described with reference to FIG. 3). This way, whenever the predefined waiting time lapses, the system enters a corrective state and the standby command is sent to the less-preferred node. The process then ends.

If the process determines that the HA peers have connectivity to each other, or at least one of them is not in an active state, the process determines (at 225) whether the HA peers can can communicate with the CCP cluster. If the CCP cluster loses its connection to both of the edge nodes, the system exits from the corrective state and the process ends, otherwise the process ends. When the HA peers are communicating with each other, at any point of time they can decide the states of the peers among themselves (even if they cannot communicate with the CCP cluster). When one edge node is active, because of the commination between the edge nodes, the other edge node becomes (or stays) standby.

When the process determines (at 210) that the system is already in a corrective state, the process determines (at 245) whether both edges are active and if their connection to each other is lost. That is, the process determines whether the split-brain failure still exists. If the process determines that both of the nodes are active without communicating to each other, the process issues a "standby" command (at 260) to the less-preferred edge node and ends, unless the process determines (at 250) that the higher ranked edge node's previous state is not active and a non-preemptive option is set in the configuration of the high availability edge nodes. The non-preemptive option, in some embodiments, shows that the edge nodes do not preemptively declare themselves as active edge nodes (e.g., when they come back from a down or suspended state), e.g., based on a set of predefined variables.

When the process determines that the higher ranked edge node's previous state is not active and the edge nodes are configured as non-preemptive, the process realizes that the higher ranked edge node has been flapping (i.e., switching between active and standby states) during the split-brain failure. If the process determines that the higher ranked edge node has been flapping, even though this node is the one that should be active, the process issues (at 255) a "standby" command to the higher ranked edge node. The process then ends.

When the process determines (at 245) that either one of the edge nodes is not active, or the connection between the edge nodes is not lost, as shown in FIG. 2B, the process determines (at 265) whether the less preferred edge node is in a standby state and the higher ranked edge node has lost its connection with the CCP cluster. If the higher ranked edge node has lost its connection to the CCP cluster and the other edge node is in standby, the process issues (at 270) an "active" command to the other edge node even though this node is less preferred compared to the higher ranked edge node to be active. This is because, the process wants to have the edge node that is communicating with the CCP cluster to be the active edge node through which the traffic passes.

On the other hand, when the process determines that the higher ranked edge node has not lost its connection to the CCP cluster, the process determines (at 275) whether the edge nodes are in an active/standby state and the edge nodes have regained their connection (i.e., the split-brain situation has been resolved). If the system is still in a split-brain failure, the process ends without taking the system out of the corrective state. On the other hand, if the process determines that the system has recovered from the split-brain failure, the process exits (at 280) the corrective state. The process then ends.

The specific operations of the process 200 may not be performed in the exact order shown and described. Additionally, the specific operations may not be performed in one continuous series of operations, and different specific operations may be performed in different embodiments. For example, before starting the correction timer, the process of some embodiments checks one last time to ensure that the split-brain condition still exists. Some such embodiments start the correction timer only when they determine that the split-brain situation still exists. Additionally, the process 200 could be implemented using several sub-processes, or as part of a larger macro process.

Figure 3:
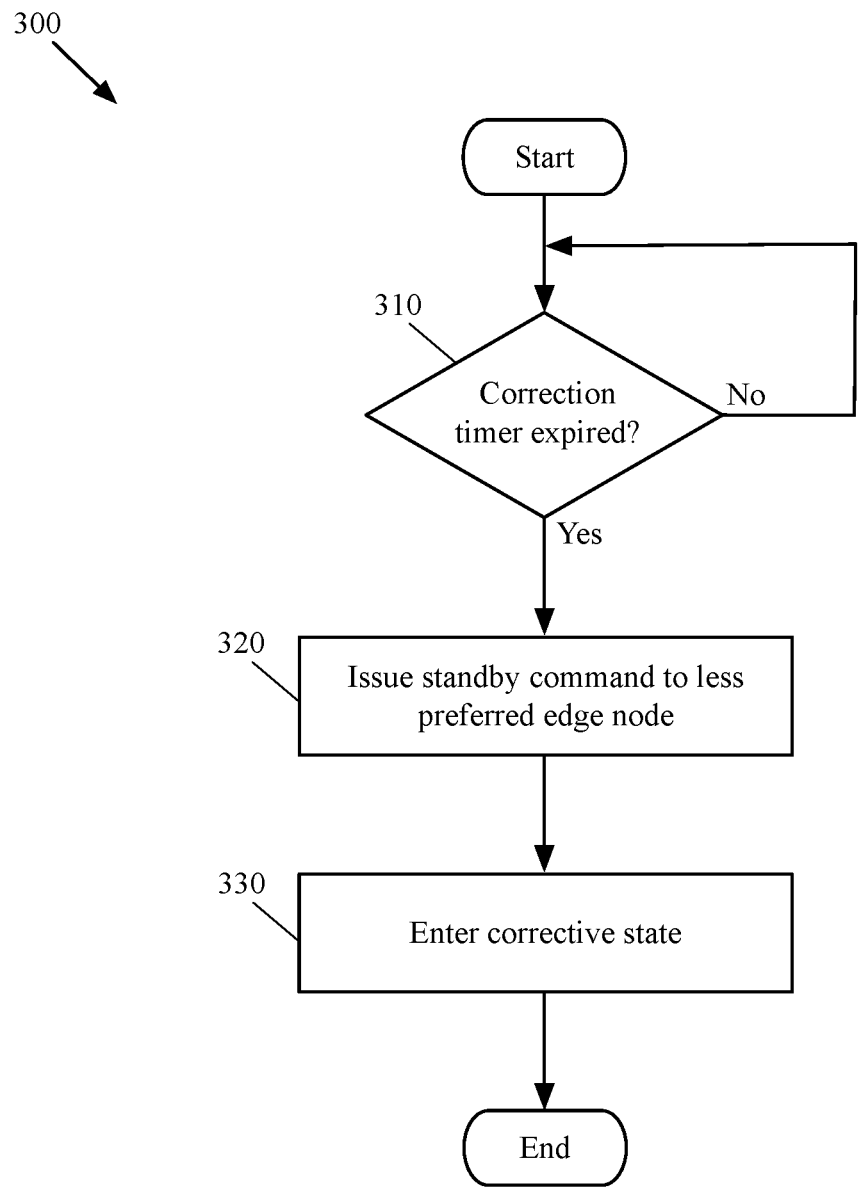
FIG. 3 conceptually illustrates a process of some embodiments for waiting for a short period of time (e.g., a predetermined period) before changing the state of the system into a corrective state.

FIG. 3 conceptually illustrates a process 300 of some embodiments for waiting for a short period of time (e.g., a predetermined period) before changing the state of the system into a corrective state. The process 300 is a recursive function that can be activated or killed by a CCP (or MP) cluster of the network in some embodiments.

Initially the process determines (at 310) whether a correction time has lapsed or not. As stated above, this correction time can be set when the system of some embodiments realized, for the first time, that the HA peers have lost their connectivity to each other and they both have an active status. In some embodiments, this correction time can be modified automatically based on the requirements of the network. In some embodiments, a user can modify the required time before the system enters into a corrective mode.

The process of some embodiments recursively makes such a determination until the correction timer lapses. Although not shown in the figure, many other conditions may end this process too. For example, when there is an update in the status of the edge nodes and the reconnect to each other, the CCP cluster of some embodiments ends the process 300. When the process determines that the correction time has lapsed, the process sends (at 320) a command to the less preferred edge node to transition to a standby state.

The less preferred edge node can be selected based on a set of conditions that determines which edge node in a pair of HA edge nodes is more preferable to be active and which edge node is not. The set of conditions to select a preferred edge node may include, in some embodiments, having more computational resources, having more PNICs (e.g., to the external networks), being assigned more network bandwidth, etc.

After the process sends the standby command to the less preferred edge node, the process changes (at 330) the status of the system to a corrective state. The process then ends. As described above, while in the corrective state, the CCP cluster is in charge of assigning the states to the HA peers. That is, the CCP cluster needs to ensure that there is an active edge node in the system. In certain scenarios after taking a corrective action (i.e., sending a standby command due to an active edge node), the CCP cluster may realize that the other edge node (i.e., the preferred active edge node) has crashed (e.g., by receiving a change of state message from that edge node). In a situation like this, the CCP cluster of some embodiments immediately reverts the corrective action by sending an "active" command to the edge node that was previously instructed to move into a standby state.

Immediately after the preferred edge node is back up and running, the CCP cluster of some such embodiments sends another "standby" command to the less preferred node if the process is still in the corrective state. It is also important to know that in the corrective state, other conditions may occur (e.g., one or both of the edge nodes lose connectivity to the CCP cluster), which are described in more detail below where a more complete CCP cluster algorithm is described.

The specific operations of the process 300 may not be performed in the exact order shown and described. The specific operations may not be performed in one continuous series of operations, and different specific operations may be performed in different embodiments. Additionally, one of ordinary skill in the art would realize that the process 300 could be implemented using several sub-processes, or as part of a larger macro process.

Figure 4:
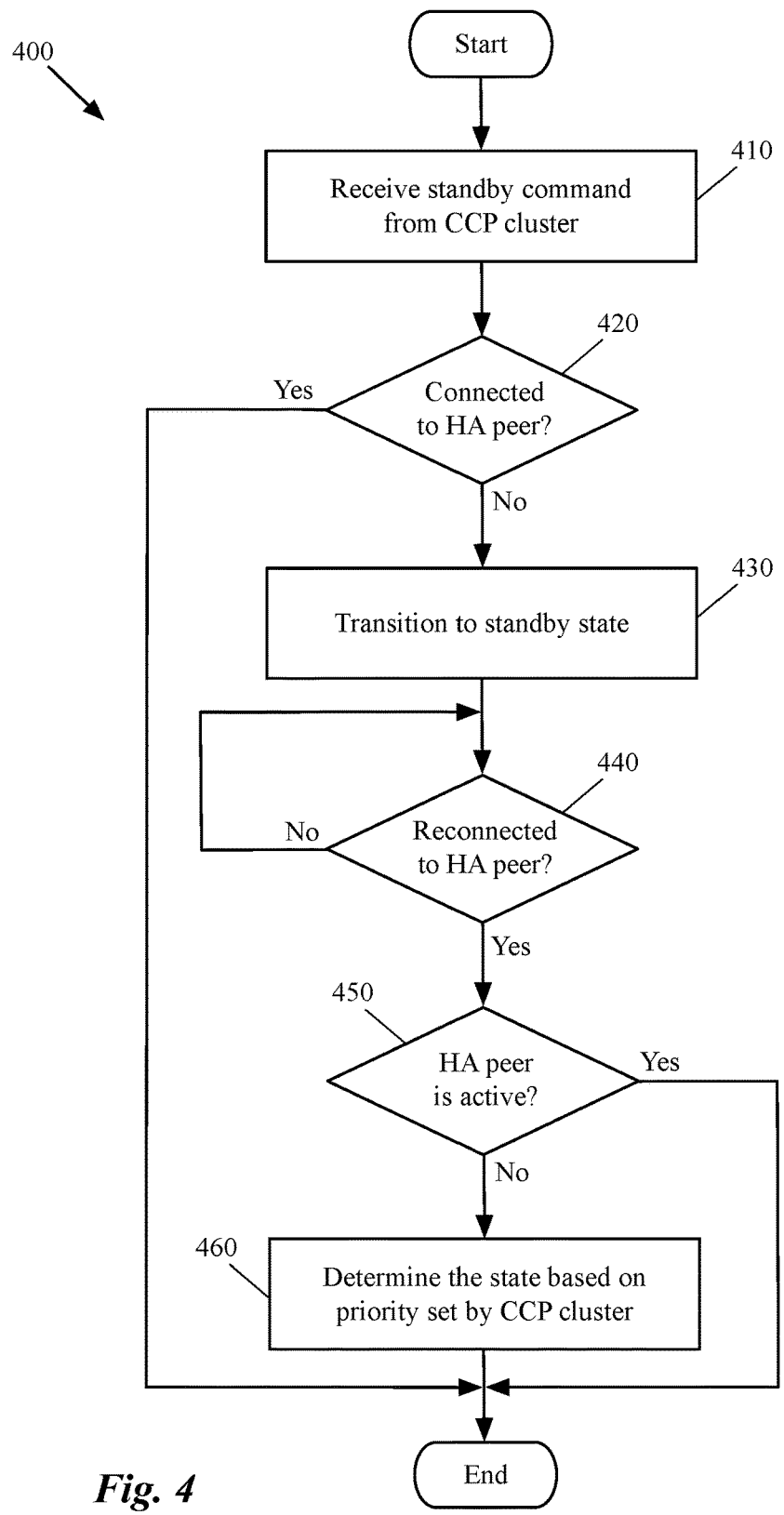
FIG. 4 conceptually illustrates a process that receives a "standby" command from a CCP (or MP) cluster during a split-brain failure.

FIG. 4 conceptually illustrates a process 400 that receives a "standby" command from a CCP (or MP) cluster during a split-brain failure. The process 400 is performed by one of the edge nodes in a pair of HA edge nodes that is experiencing a split-brain situation in some embodiments. As described above, the edge node that receives this command is the less preferred edge node for being an active edge in some embodiments.

The process 400 starts by receiving (at 410) a command from the CCP cluster to move into a standby state. However, the process of some embodiments does not immediately obey this command before ensuring that the split-brain condition is still in place. That is, a command from the CCP cluster is not honored if the HA peer has regained connectivity to its peer. As such, upon receiving the command, the process determines (at 420) whether any connectivity has been regained with the other peer.

When the process determines that the two HA peer are reconnected, the process ends. That is, when a direct link is established between the two nodes, the two HA peers can negotiate the status of the peers between themselves and there is no need to receive instructions from the CCP cluster anymore. On the other hand, if the process determines, through this last checking, that the two HA peers are disconnected, the HA peer that has received the command transitions (at 430) into a standby state (if the state is not standby already).

The process then determines (at 440) whether a connection with the other peer is established. That is, during the corrective state, the process periodically checks to see whether any new connection with the other peer is established. If no connection is established, the standby peer stays in the standby state. Otherwise, the process checks the status of the other peer. That is, the process, after the two HA peers are reconnected, receives the status of the other peer (e.g., through the CCP cluster or directly form the other peer). The process determines (at 450) whether the other peer is an active peer or passive.

When the process determines that the other peer is active, the process ends. This is because the HA peer on which the process is being performed has been in standby state since receiving the standby command from the CCP cluster. When the process determines that the other peer is not active (e.g., the other peer is standby or unavailable), the process determines (at 460) the state of the HA peer based on a set of priority conditions (e.g., set by the CCP cluster). In other words, when both of the edge nodes are in the standby mode and connected to each other, the HA nodes start negotiating with each other to decide which node should be active and which node should stay passive.

The specific operations of the process 400 may not be performed in the exact order shown and described. Additionally, the specific operations may not be performed in one continuous series of operations, and different specific operations may be performed in different embodiments. For example, when the process of some embodiments realizes that the edge node is connected to its peer (at operation 420), the process sends a message to the CCP cluster so that the CCP cluster resets the corrective state (i.e., the CCP cluster exits from the corrective state). Additionally, one of ordinary skills would realize that the process 400 could be implemented using several sub-processes, or as part of a larger macro process.

Figure 5:
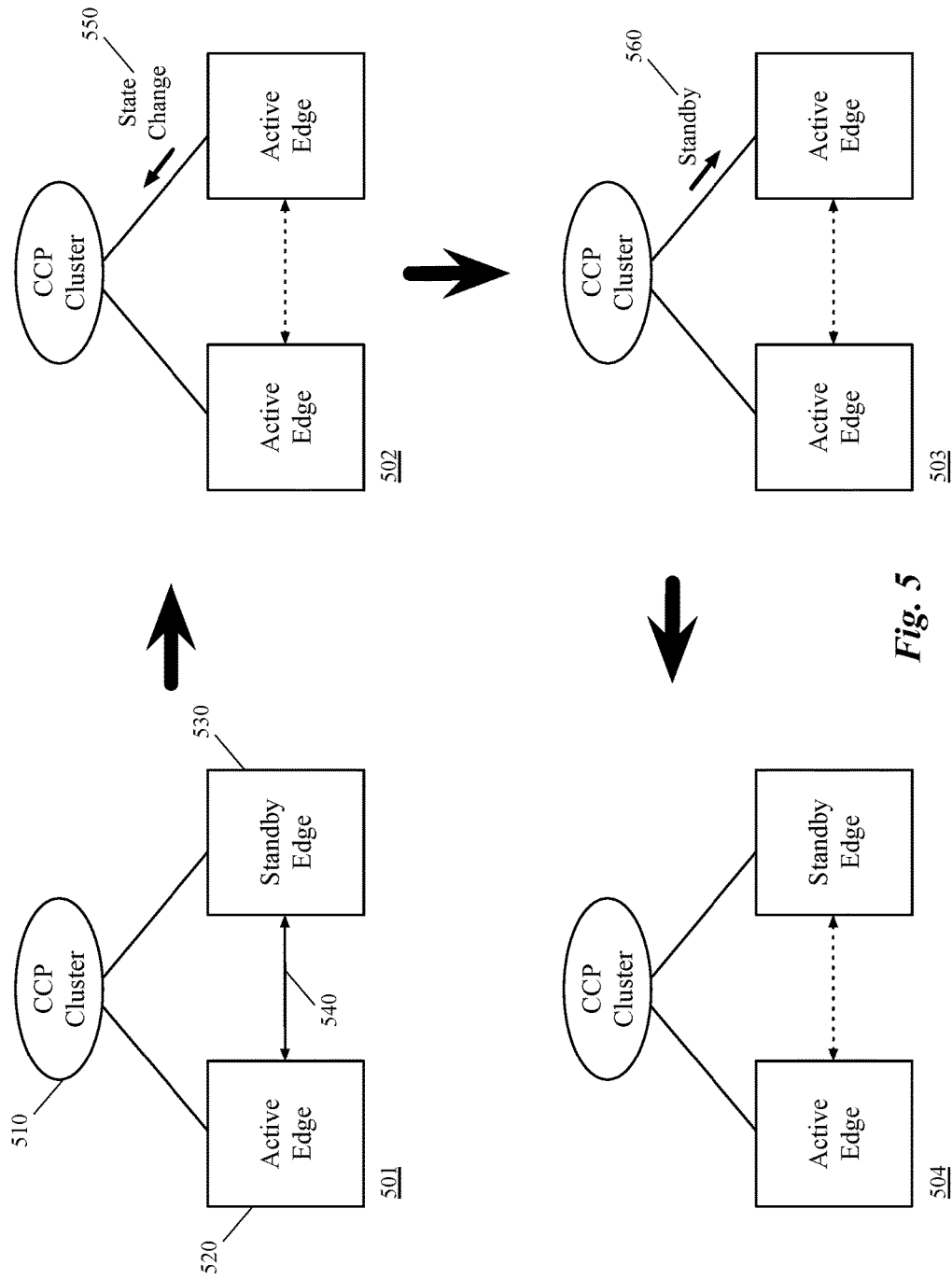
FIG. 5 illustrates an example of a CCP/MP cluster adjusting the states of the peers in a pair of HA peers when the HA peers lose connectivity to each other.

FIG. 5 illustrates an example of a CCP/MP cluster adjusting the states of the peers in a pair of HA peers when the HA peers lose connectivity to each other. More specifically, this figure shows, through four different stages 501-504, how the CCP cluster receives updated states from two active edge nodes and based on the received data assigns one of the edge nodes as a standby edge node. The figure includes a CCP cluster 510 and a pair of edge nodes 520 and 530. The two edge nodes in the pair are connected to each other through a direct link 540.

It is important to note that even though in the illustrated example only one link connects the two HA edge nodes, in some embodiments a pair of edge nodes are connected through several different HA interfaces. In fact, as described above, some embodiments increase the number of these links in order to avoid a split-brain situation in the first place.

The first stage 501 illustrates that the system is in a normal condition and one edge node (520) is in an active state, while the other edge node (530) is in a standby state. Both edge nodes are connected to the CCP cluster as well as to each other. As such, no corrective action needs to be taken by the CCP cluster. Under this normal condition, the active edge node 520 handles the north-south traffic of a network and provides the required stateful services such as stateful firewall for the DCNs of the network. On the other hand, the standby edge node 530 does nothing and only updates its configuration and data (periodically or upon receiving a message from the active edge node or the CCP cluster) to copy the configuration of and data stored on the active edge node.

The second stage 502 shows that the link (path) 540 between the two edge nodes is disrupted (shown with dotted line) and as a result, the edge node 530, that in the previous stage was in a standby mode, has transitioned to an active mode. This is because this edge node at this point does not know whether the active edge node 520 is still available and running or not. As such, at this stage both edge nodes are active and provide edge node services to the DCNs of the network. Therefore, depending on which active edge node receives a request from a DCN of the network, the DCNs may receive edge services from either of the edge nodes in parallel which results in inconsistency and disruption in the network.

The second stage 502 also shows that immediately after the change of state in the edge node 530, this edge node sends a state change message 550 to the CCP cluster. The state change message 550 not only tells the CCP cluster 510 that the state of the edge node 530 has been changed from standby to active, but also the message tells the CCP cluster that there is no connectivity between the sender of the message and its peer. Although a single message is described, above and below, to carry both disconnection and change of state messages to the CCP cluster, in some embodiments, these two messages are sent through two separate packets or sets of packets. The other edge node also sends a state change message to the CCP cluster 510 (not shown) that would tell the cluster that the two edge nodes are currently not communicating.

The third stage 503 shows that after receiving the change of state message 550, the CCP cluster 510 sends a "standby" command 560 to the edge node 530. However, as described above, the CCP cluster does other operations before sending the command to the edge node that are not shown in this figure for simplicity of description. For example, the CCP cluster makes sure to change the state of the system to a corrective state (meaning that the CCP cluster is now responsible for adjusting the states of the HA peers). The CCP cluster also makes sure to wait for a certain amount of time (correction time) within the corrective state before sending the command to the edge node 530. Additionally, the CCP cluster makes sure that the edge node 530 is a less preferred edge node to be selected as an active edge node and then sends the command to this node.

The fourth stage 504 illustrates that as a result of receiving the command 560, the edge node 530 changes its state from active to standby. As described above with reference to FIG. 4, before changing its state, however, the edge node 530 checks one last time to make sure that the connection 540 is still not reestablished and the edge nodes are experiencing a split-brain situation. Therefore, even though the edge nodes 520 and 530 are still not connected to each other at this stage, the pair of HA peers are functioning as if the conditions are normal. That is, one of the edge nodes in the pair of HA edge nodes is an active (or primary) node while the other edge node is standby (or secondary).

A more complete algorithm for recovering from a split-brain condition by the CCP/MP cluster is now described. In this algorithm, the corrective_state can be a Boolean variable taking the values 0 (meaning the system is in a normal state) and 1 (meaning the system is in a corrective state). Similarly, the variable ha connection_status is also a Boolean that shows (i) no connection is established when it has a value of 0 and (ii) there is a connection between the edge nodes when its value is 1. The ha_connection_lost variable indicates whether the two HA peers are connected or not. The E1_connection_lost and E2_connection_lost are two variables that when set indicate that the corresponding edge node is not connected to the CCP cluster.

The ha_correction_timer variable represents the correction timer which is triggered whenever the CCP cluster is informed about a split-brain situation for the first time. That is, the CCP cluster receives a change of state message from one of the HA peers. The CCP cluster does not issue a standby command to one of the edge nodes unless this variable shows that the required time before sending the command has lapsed. The non-preemptive variable shows that the edge nodes do not preemptively declare themselves as active edge nodes (e.g., when they come back from a down or suspended state) based on a set of predefined variables. Additionally, E1 and E2 are two HA peers at the edge of a network that are in an active/standby state with the former having a higher priority (i.e., E1 has a higher priority and therefore is selected as the active node).

Record HA session states of E1, E2 and also the connection status between E1 and E2;

When in corrective state and non-preemptive operation, record previous states of E1, E2; if (ha_connection_status=0) is reported by either of the nodes, ha_connection_lost=1; if (ha_connection_status=1) is reported by either of the nodes, ha_connection_lost=0; if states of E1, E2, or ha_connection_lost change, do the following:

```
if (!corrective_state) {
    if (((E1=Active AND E2=Standby) OR (E1=Standby AND
    E2=Active)) AND
    !ha_connection_lost AND ha_correction_timer is running) {
        kill ha_correction_timer thread;
    } else if (E1=Active AND E2=Active AND ha_connection_lost) {
        Start ha_correction_timer;
    } else if (E1_connection_lost AND E2_connection_lost) {
        corrective_state=0;
    }
} else
{
    if (E1 =Active AND E2 =Active AND ha_connection_lost) {
        If (E1_previous_state != Active AND non-preemptive) {
            Issue ha_standby to E1;
        } else
        {
            Issue ha_standby to E2;
        }
    } else if (E1_connection_lost AND E2=Standby) {
        Issue ha_active to E2;
    } else if ((E1=Active AND E2=Standby) OR (E1=Standby AND
    E2=Active))
    AND !ha_connection_lost) {
        corrective_state=0;
    }
}
```

The above algorithm begins by recording both of the states of the edge nodes and the connection status received from both of the edge nodes. The algorithm then records previous states of the edge nodes when the system is in corrective state and non-preemptive operation is defined for the edge nodes. The algorithm, based on the connection status received from the edge nodes sets the ha_connection_lost variable. If the states of any of the edge nodes changes or the connection state between the edges changes (e.g., the edges get disconnected or reconnected), the algorithm enters the if-then-else expression. The "if" branch of the algorithm is executed when the system is not in a corrective state and the "else" branch is executed when the system is already in a corrective state.

As shown in the algorithm, when the system is not in a corrective state, the CCP cluster first checks to see if the split-brain situation is already resolved. That is, when the CCP cluster sees that the edge nodes are in active/standby states and the connection between the edge nodes is not lost and the correction timer is running, the CCP cluster kills a correction timer thread. As seen below, this thread is a recursive function that continuously (e.g., periodically) checks to see whether the correction timer is expired in order to issue a "standby" command to the less-preferred node (i.e., E2) and to set the state of the system to a corrective state. The following algorithm illustrates an HA correction timer thread.

```
If (ha_correction_timer_expired) {
    Issue ha_standby to E2;
    corrective_state = 1;
    Exit thread;
}
```

Returning to the algorithm, if the CCP cluster doesn't see any recovery in the split-brain situation and instead determines that both of the edge nodes are in an active state and the connection between them is lost, the CCP cluster starts the correction timer. This way, whenever the predefined waiting time lapses, the if-then expression in the correction timer thread is triggered and the system enters a corrective state and the standby command is sent to the second node. On the other hand, if the CCP cluster loses its connection to both of the edge nodes, the system exits from the corrective state.

In the "else" branch, where the system is already in the corrective state, the CCP cluster first checks to see whether both edges are active and if their connection to each other is lost. If so, the algorithm issues a "standby" command to the less-preferred edge node (i.e., E2) unless the higher ranked edge node's (i.e., E1) previous state is not active and non-preemptive option is set. Because these conditions are indicative of the first edge node (E1) is constantly flapping (i.e., switching between different states) after the split-brain occurred. If the CCP cluster realizes that E1 is flapping, even though this node is the higher ranked node, the cluster issues the "standby" command to this edge node.

If either one of the edge nodes is not active, or the connection between the edge nodes is not lost, the CCP cluster issues an "active" command to the second edge node if the first edge has lost its connection to the CCP cluster and the second edge node is standby. Otherwise, if the edge nodes are in an active/standby state and the edge nodes have regained their connection (i.e., the split-brain situation has been resolved), the CCP cluster takes the system out of the corrective state.

The following algorithm is performed by either of the edge nodes when the CCP/MP cluster is in charge of deciding for the HA peers' states.

```
If (ha_connection_status OR ha_state changes) {
    Send ha_connection_status and ha_state to CCP;
}
If (not_connected_to_ha_peer) {
    If (connected to CCP) {
        Follow CCP_command;
    } else
    {
        Don't be Active;
    }
} else
{
    Ignore if there is a CCP command;
}
```

As shown, in the above algorithm whenever the connection status between the edge nodes or the state of the edge node changes, the edge node sends its state and the connection status to the CCP cluster. Additionally, when an edge node is connected to its peer, the edge node will ignore any command received from the CCP cluster. This way, the edge nodes will follow their negotiated active/standby states irrespective of receiving a command from the CCP cluster instructing them otherwise.

On the other hand, when the edge nodes are not connected to each other, if the edge node is connected to the CCP cluster, the edge node will follow the command received from the CCP cluster. If the edge node is not connected to the CCP cluster, however, the edge node automatically moves out of an active state if it is in that state. In some embodiments, the edge node moves to a standby state or to a down state (suspended state) depending on the other conditions in the algorithm. This way, if both of the edge nodes are disconnected from each other and from the CCP cluster, both edge nodes transition to a standby state.

Some scenarios that can occur and the result of execution of the above described algorithm under that scenario are described below. When the edge nodes are able to communicate with the CCP cluster but lose connectivity to each other, as described above, a split-brain scenario occurs. Based on the above algorithm, the CCP cluster triggers the correction times (i.e., activates the ha_correction_timer variable) and three possible scenarios can follow. Under the first scenario, when the connectivity between the edge node resumes before ha_correction_timer expires, the state of the edge node that transitioned to an active state (E2) will be updated back to a standby state and ha_correction_timer will be stopped (reset). No action will be taken by the CCP cluster as the nodes were able to correct the condition.

Under the second scenario, if the connectivity between the edge nodes resumes right after ha_correction_timer expires (or just after getting the command from the CCP cluster), the command from the CCP cluster will be ignored as the nodes can communicate with each other. Finally, under the third scenario, if connectivity between the edge nodes is not resumed until the ha_correction_timer expires, the CCP cluster takes the corrective action and the less preferred edge node (E2) becomes standby. Under this last scenario, until the edge nodes regain the connection between each other, the CCP cluster is responsible for ensuring that there is always an active node in the system.

As such, if E1 crashes, the CCP cluster will issue an ha_active command to E2. When E1 comes back up, this edge node will become active again (under the preemptive operation). Under a non-preemptive operation, the CCP cluster will issue a ha_standby command to E1 or else to E2. Alternatively, while the CCP cluster is in charge of the states (in a corrective state of the system), if E1 resumes connection with E2, the edge nodes will decide the active/standby roles and the CCP cluster exits the corrective state.

Another scenario is when none of the nodes can communicate with the other nodes (edge nodes and controllers in the CCP cluster). Based on the above algorithm, both edge nodes will be in standby mode even when both of the edge nodes are healthy. It might not be desirable to have two secondary or passive edge nodes when both of the edge nodes are healthy (e.g., the edge nodes have no connection to each other or to the CCP cluster, the active edge node is flapping in the corrective state, etc.). In other words, it may be more preferable to have a split-brain rather than two healthy standby nodes so that all of the edge services are not down. This can be achieved by adopting the following algorithm on the edge nodes.

```
If (not_connected_to_ha_peer) {
    If (connected to CCP) {
        Follow CCP_command;
    } else
    {
        Move to Active;
    }
} else
{
    Ignore if there is a CCP command;
}
```

The above algorithm, when performed by either of the edge nodes, first checks to see if the edge node is connected to its peer. If the edge node is connected to the other node, the edge node will ignore any command received from the CCP cluster. This way, the edge nodes will follow their negotiated active/standby states irrespective of receiving a command from the CCP cluster instructing them otherwise.

On the other hand, when the edge nodes are not connected to each other, if the edge node is connected to the CCP cluster, the edge node will follow the command received from the CCP cluster. If the edge node is not connected to the CCP cluster, the edge node automatically moves into an active state. This way, if both of the edge nodes are disconnected from each other and from the CCP cluster, both edge nodes transition to an active state.

Another scenario that can occur is when the edge nodes cannot communicate with each other and the higher ranked edge node (i.e., E1) loses connectivity to the CCP cluster. Based on the above algorithm, E1 will not be in active state as it does not have connectivity with the CCP cluster either. As a result, the lower ranked edge node (i.e., E2) will become the active node of the pair.

Another possible scenario is when the edge nodes are able to communicate with each other (i.e., there is a connection between the edge nodes). When the edge nodes are connected to each other, if the higher ranked edge node (i.e., E1) crashes, the communication session between the edge node (e.g., a BFD session) is lost and the lower ranked edge node (i.e., E2) becomes active. No corrective action is taken by the MP/CCP cluster under this condition. Similarly, if the lower ranked edge node (i.e., E2) crashes or becomes unavailable, MP/CCP cluster does not take an action either. The last scenario is when the edge nodes can communicate with each other but the higher ranked node (E1) loses connectivity to the CCP cluster. Under this scenario, no corrective action will be taken by the CCP cluster as it will get the connection status from the other edge node (E2).

II. Edge Nodes Determine the HA States

As stated above, in some embodiments, instead of the CCP cluster, the HA peers take the corrective action themselves. However, similar to the embodiments in which the CCP cluster takes the corrective action, the CCP cluster in these embodiments is employed too to pass the states of the edge nodes (and the CCP cluster) to the edge nodes. That is, the edge nodes send their states and/or HA connection status to the CCP cluster each time their state and/or HA connection status changes. However, unlike the embodiments in which the CCP cluster takes the corrective action, here the CCP cluster does not evaluate the status of the edge nodes, nor does the CCP cluster send a "standby" command to the less preferred edge node. Instead, upon receiving a state transition, the CCP cluster records and forwards the HA states to the edge nodes. In some embodiment, in addition to the states of the edge nodes, the CCP cluster sends its majority cluster status to the edge node from which it has received a state transition message.

The majority cluster status informs the edge nodes whether the majority of the controllers in the CCP cluster, to which the edge nodes are connected, are healthy and active or not (if the CCP cluster is partitioned then the edge node should be connected to the majority of the nodes in the partition). In this approach, when an HA peer receives the majority state acknowledgement from the CCP cluster, the HA peer changes its state based on the state of the other peer. That is, if the other peer's state is active, the HA peer transitions into a standby state and if the other peer's state is standby, the HA peer transitions into an active state.

On the other hand, if the edge node does not receive a majority state acknowledgment back from the CCP cluster (within a specified period), or if the received status from the CCP cluster shows the CCP cluster as a minority cluster, in some embodiments, the edge node steps down from an active state if it is in that state. As a result of this approach, when both edge nodes lose connectivity to the CCP cluster (or the majority of controllers in the CCP cluster), the edge nodes transition into standby states.

In some other embodiments both of the edge nodes can be disconnected from each other and from the CCP cluster as long as the edge nodes are healthy and in active states. This is because in these embodiments, it is more desirable to have two healthy and active edge nodes (that are disconnected from each other) than to have both edge nodes in standby states and not providing any edge node services. In some such embodiments, the edge nodes are not required to receive a majority cluster status acknowledgement from the CCP cluster. In other words, when each of the edge nodes are not connected to any other node (the HA peer or a controller), the edge node moves into an active state in order to provide at least some of the edge services (e.g., routing, stateful services, etc.).

In some embodiments, as long as an HA peer is connected to a controller in the CCP cluster, the HA peer checks for the connectivity status of the other peer to the CCP cluster. When the other peer is not connected to the CCP cluster the HA peer transitions into an active state (if not in that state already). Additionally, when an HA peer is not connected to any other node (i.e., neither a controller in the CCP cluster, nor the other HA peer), the HA peer changes its state to an active state. As a result of this approach, when both of the HA peers are not connected to any other node, they become active edge nodes.

Figure 6:
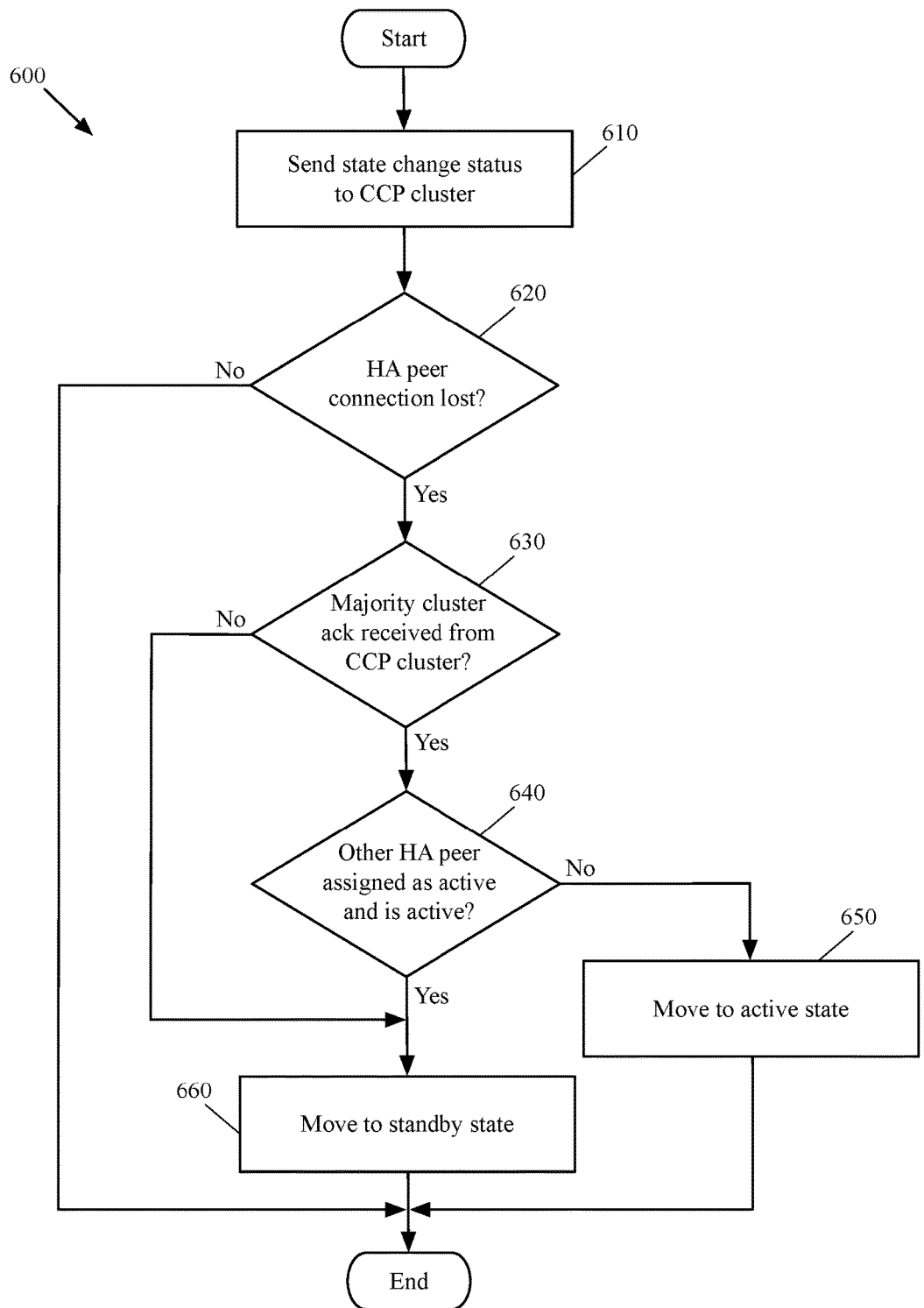
FIG. 6 conceptually illustrates a process of some embodiments for determining the state of an edge node during a split-brain failure by the edge node.

FIG. 6 conceptually illustrates a process 600 of some embodiments for determining the state of an edge node during a split-brain failure by the edge node. The process 600 is performed by either of the edge nodes in a pair of HA edge nodes that is experiencing a split-brain situation in some embodiments. The process starts by sending (at 610) a state change message to the CCP cluster. That is, each time a state of an edge node in a pair of high availability edge nodes is changed, the edge node sends a message to inform the CCP cluster about this state change. For instance, each time an HA peer changes its state from active to standby or when the edge node is down, it sends a message about the updated status to the CCP cluster.

The process then determines (at 620) whether the HA peer is connected to the other HA peer (e.g., through one or more direct links between the peers). When the process determines that the HA peer has not lost connectivity to its peer, the process ends because through the connection the HA peers can always negotiate their states and based on an HA algorithm (e.g., a predefined algorithm) adjust their states to be in an active/standby state. However, when the process determines that the HA peer has lost its connectivity to its peer (i.e., in a split-brain state), the process determines (at 630) whether the edge node has received a majority cluster acknowledgment from the CCP cluster.

As described before, each time an edge node sends a state change message to the CCP cluster, the edge node receives a message from the CCP cluster that indicates the majority cluster status of the CCP cluster. The majority cluster acknowledgment informs the edge node whether the majority of controllers in the cluster (or the majority of controllers in a partition of cluster to which the edge node is connected) are up and functional. Also as described above, in addition to sending the majority cluster acknowledgment to the edge node from which the state change message is received, the CCP cluster sends the updated state of the edge node to the edge node's peer in the pair of HA edge nodes.

When the process determines that the edge node has not received a majority cluster acknowledgement from the CCP cluster (or it has received a minority cluster status), the process proceeds to operation 660 which is described below. In some embodiments, the process has to receive this acknowledgement within a corrective time (e.g., before the expiration of a timer set by the configuration of the system).

On the other hand, when the process determines that the CCP cluster has sent a majority cluster acknowledgement to the edge node, the process determines (at 640) whether the other edge node of the HA pair is an assigned primary edge node which is also active or not. In other words, the process has to be ensured that the edge node on which the process is performed is a secondary (standby) edge node (based on the defined HA algorithm).

When the process determines that the other peer is a primary edge node that is active, the process directs the edge node (on which the process is performed) to move (at 660) into a standby state. When the process determines that the other peer is not active (e.g., the other peer is standby or unavailable), the process moves (at 650) to an active state.

The specific operations of the process 600 may not be performed in the exact order shown and described. Additionally, the specific operations may not be performed in one continuous series of operations, and different specific operations may be performed in different embodiments. For example, the process 600 of some embodiments, in addition to determining whether the other peer that is assigned as active node is not active (at 640) in order to move into an active state, also checks whether the peer is still connected to the CCP cluster. In some such embodiments, the edge node transitions to an active state so long as the other edge node is not connected to the CCP cluster (and of course to the edge node since they are in a split-brain condition). Additionally, the process 600 could be implemented using several sub-processes, or as part of a larger macro process.

Figure 7:
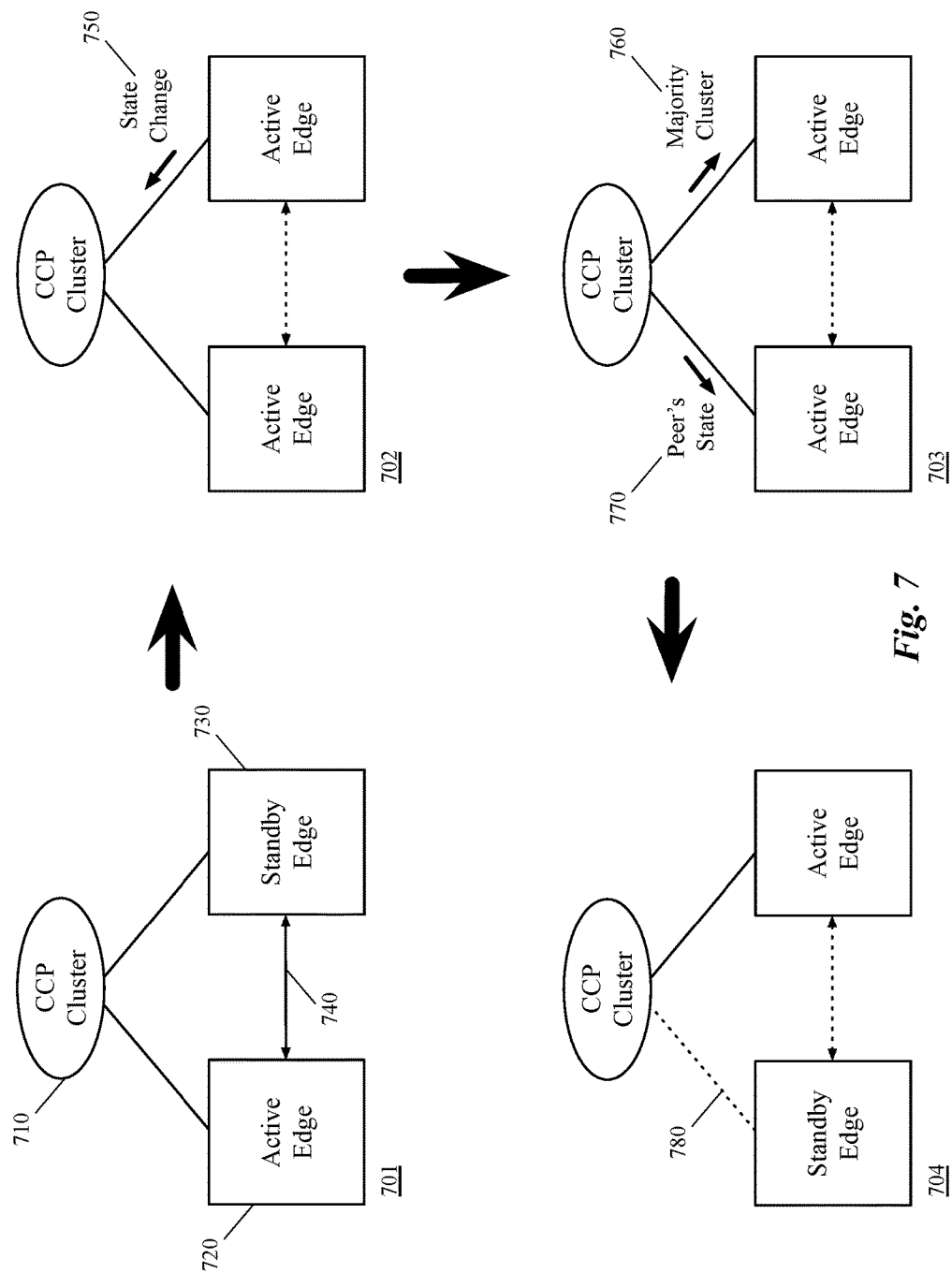
FIG. 7 illustrates an example of an edge node in a pair of HA edge nodes adjusting its state during a split-brain condition based on the status of the other edge node and the majority cluster status of the CCP cluster.

FIG. 7 illustrates an example of an edge node in a pair of HA edge nodes adjusting its state during a split-brain condition based on the status of the other edge node and the majority cluster status of the CCP cluster. More specifically, this figure shows, through four different stages 701-704, how an edge node reports its state change to a CCP cluster and decides, based on the majority cluster status and the state of the other edge node, to stay at the changed state. The figure includes a CCP cluster 710 and a pair of edge nodes 720 and 730. The two edge nodes in the pair are connected to each other through a direct link 740.

The first stage 701 illustrates that the system is in a normal condition and one edge node (720) is in an active state, while the other edge node (730) is in a standby state. Both edge nodes are connected to the CCP cluster as well as to each other. As such, no corrective action needs to be taken by the edge nodes. Under this normal condition, the active edge node 720 handles the north-south traffic of the network and provides the required stateful services such as stateful firewall for the DCNs of the network. On the other hand, the standby edge node 730 does nothing and only updates its configuration and data (periodically or upon receiving a message) to copy the configuration of and data stored on the active edge node.

The second stage 702 shows that the link (path) 740 between the two edge nodes is disrupted (shown with dotted line) and as a result, the edge node 730 that in the previous stage was in a standby mode has transitioned into an active mode. This is because this edge node at this point does not know whether the active edge node 720 is still available and running or not. As such, at this stage both edge nodes are active and provide edge node services to the DCNs of the network. Therefore, depending on which active edge node receives a request from a DCN of the network, the DCNs may receive edge services from either of the edge nodes in parallel which results in inconsistency and disruption in the network. The second stage 702 also shows that immediately after the change of state in the edge node 730, this edge node sends a state change message 750 to the CCP cluster.

The third stage 703 shows that after receiving the change of state message 750, the CCP cluster 710 sends a majority cluster status acknowledgement 760 to the edge node 730. That is, the CCP cluster first makes sure that the majority of the controllers in the cluster (or in a partition of the cluster) are functional and healthy. After confirming that the majority of controllers are running, the CCP cluster sends the acknowledgement 760 to the edge node 730. The CCP cluster 710 also sends the received status of the edge node 730 in a state update message 770 to edge node's peer, which is edge node 720.

The fourth stage 704 shows that the link 780 (e.g., a control channel) between the CCP cluster 710 and the edge node 720 is also disconnected. As a result, when the edge node 720 realized that it has lost its connection to both of the CCP cluster 710 and the other edge node 730, the edge node 720 transitions from its active state into a standby state (based on the algorithm performed by process 600 described above by reference to FIG. 6).

Because of the disconnection, the CCP cluster send a message to edge node 730 indicating that the edge node 720 is disconnected (e.g. the message shows the status of this edge node as null instead of standby). On the other hand, when the edge node 730 realizes that it is not connected to its peer, the edge node determines whether the other HA peer 720 is active, standby, or disconnected. When the edge node 730 realizes that the other edge node is disconnected, as shown, the edge node 730 stays active.

The following algorithm demonstrates the corrective action that a high availability edge node takes during a split-brain situation, for which a majority cluster acknowledgement is required to be received from the CCP cluster.

```
If (not_connected_to_ha_peer) {
    Move to Active if not already in this state;
    If (No CCP cluster majority ack within corrective_time) {
        Move to Standby if not already in this state;
    } else if (ccp_peer_ha_state=Standby) {
        Move to Active if not already in this state;
    } else if (ccp_peer_ha_state=Active AND I am secondary node) {
        Move to Standby if not already in this state;
    }
} else
{
    Follow the regular HA algorithm;
}
```

In the above algorithm, as long as the edge node is connected to its peer, the edge node follows the regular HA algorithm. That is, the two peers negotiate the states and decide which one should be active and which one should be standby based on a defined HA algorithm (e.g., defined by a network administrator). However, when the edge node is not connected to its peer, the edge node immediately moves into an active state (if other conditions to be in the active state defines in the regular HA algorithm are satisfied).

The edge node then checks to see if the edge node has received a majority cluster acknowledgement from the CCP cluster (after the edge node sends its state change message to the CCP cluster) within a corrective time. If the edge node determines that it has not received an acknowledgement back from the CCP cluster, the edge node moves into a standby state (if not already in this state). Otherwise, the edge node checks to see whether its peer's state is standby. If so, the edge node moves into an active state (if other conditions to be in the active state defines in the regular HA algorithm are satisfied). When the edge node has received the acknowledgement within the corrective time and determined that the peer's status is not standby, the edge node moves into a standby status, only if the edge node determines that it is a secondary edge node (based on the HA algorithm is assigned as a secondary node) and the other edge node is in an active state.

The following algorithm, unlike the last algorithm described above, demonstrates the corrective action that a high availability edge node takes during a split-brain situation, for which a majority cluster acknowledgement is not required to be received from the CCP cluster.

```
If (not_connected_to_ha_peer AND connected to CCP) {
    If (ccp_peer_ha_state=NULL) {
        Move to Active if not already in this state;
    } else if (ccp_peer_ha_state=Standby) {
        Move to Active if not already in this state;
    } else if (ccp_peer_ha_state=Active AND I am secondary node) {
        Move to Standby if not already in this state;
    }
} else If (not_connected_to_any_node) {
    Move to Active if not already in this state;
} else
    Follow the regular HA algorithm;
}
```

In the above algorithm, as long as the edge node is connected to its peer, the edge node follows the regular HA algorithm. That is, the two peers negotiate the states and decide which one should be active and which one should be standby based on a defined HA algorithm (e.g., defined by a network administrator). Additionally, if the edge node is neither connected to its peer, nor to any controller in the CCP cluster, the edge node moves into an active state. However, when the edge node is not connected to its peer but it is connected to at least one controller in the CCP cluster, the edge node immediately moves into an active state (if other conditions to be in the active state defines in the regular HA algorithm are satisfied).

The edge node then checks to see if its peer's state is null. In some embodiments, when an edge node is not connected to any controller in the CCP cluster, the edge node receives a "null" status. If the edge node determines that its peer's state is "null," the edge node moves into an active state (if other conditions to be in the active state defines in the regular HA algorithm are satisfied). Otherwise, the edge node checks to see whether its peer's state is standby. If so, the edge node moves into an active state (if other conditions to be in the active state defines in the regular HA algorithm are satisfied), if not, the edge node moves into a standby status, only if the edge node determines that it is a secondary edge node (based on the HA algorithm is assigned as a secondary node) and the other edge node is in an active state.

In some particular network architectures, the connection to a network manager is initiated on an edge and edges can have a direct connection between themselves over the management interface. Therefore, in this type of architecture both management and data interfaces are used for HA communication (e.g., with BFD). For the majority of the scenarios, if an edge has lost connectivity to the other edge, chances are that it has also lost its connectivity to the MP/CCP cluster. However, if the MP/CCP cluster is in the same rack as one of the edges, it is possible that the edge on this particular rack can lose connection with its HA peer but not with the MP/CCP cluster.

Since in such a network architecture (i.e., management interfaces are also used for HA communication), there is no known scenario in which the edges lose connectivity to each other but both edges maintain communication with the CCP cluster, the algorithm to be used by either of the edge nodes is modified as follows.

```
If (not_connected_to_ha_peer) {
    Move to Active if not already in this state;
    If (No CCP cluster majority ack within corrective_time) {
        Move to Standby if not already in this state;
    }
} else
{
    Follow the regular HA algorithm;
}
```

As can be seen in the above algorithm, as long as the edge node is connected to its peer, the edge node follows the regular HA algorithm. However, when the edge node is not connected to its peer, the edge node immediately moves into an active state (if other conditions to be in the active state defines in the regular HA algorithm are satisfied). The edge node then checks to see if the edge node has received a majority cluster acknowledgement from the CCP cluster (after the edge node sends its state change message to the CCP cluster) within a corrective time. If the edge node determines that it has not received an acknowledgement back from the CCP cluster, the edge node moves into a standby state (if not already in this state).

The difference between this algorithm and the other algorithm above, in which the majority cluster status was required is that in this algorithm, there is no need to check for any condition under which the edge node is connected with the CCP cluster and has received the majority cluster status acknowledgement from the CCP cluster. This is because, in this type of network architecture, as described above, if the edge node's connection with the CCP cluster is good, that means this edge node is in the same rack with the CCP cluster (here it is the manager) and the state of the other edge node must be "null" as the CCP cluster would not be able to connect to the other edge node.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
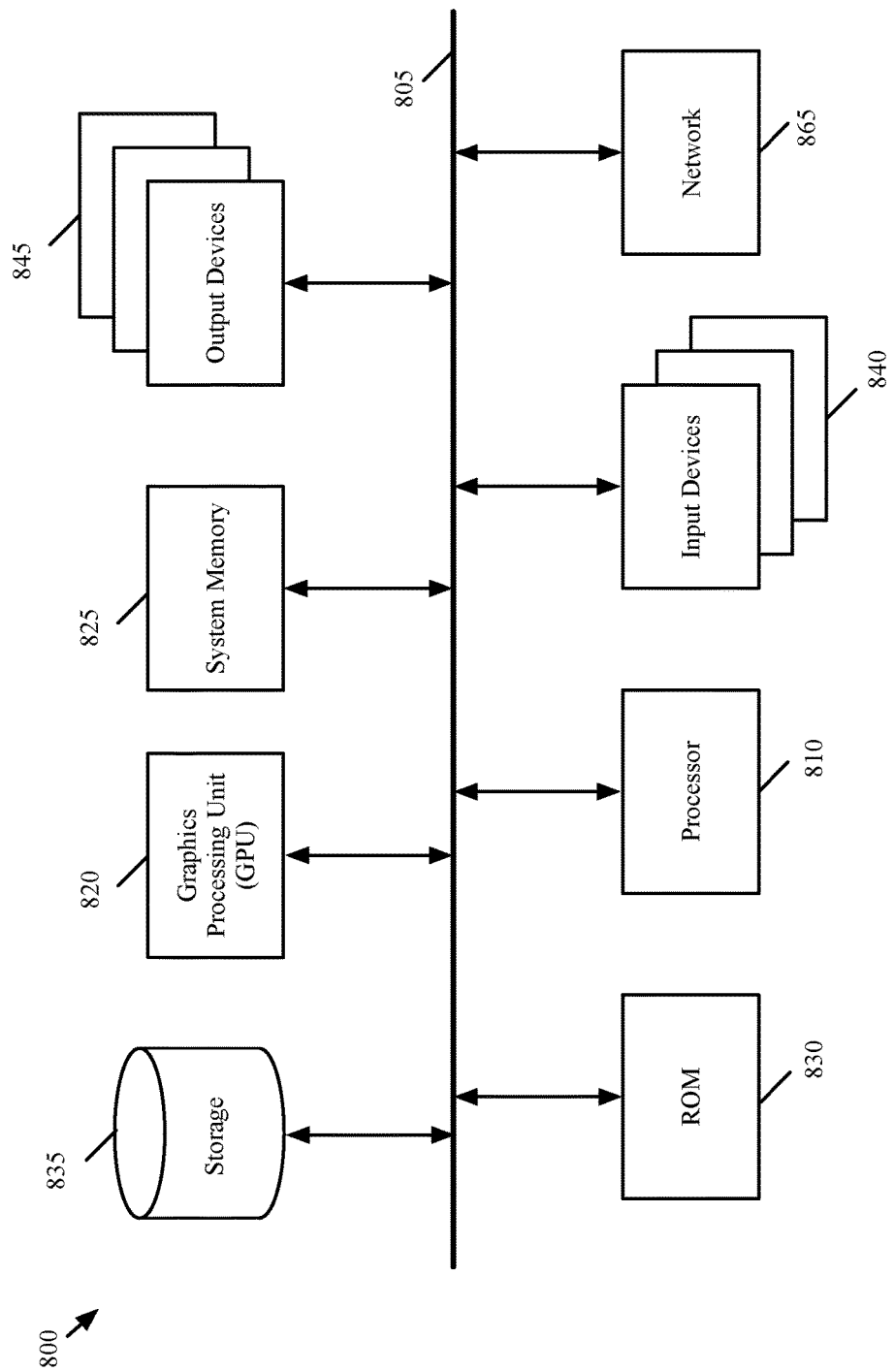
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices, such as a touchscreen, that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 2A-2B, 3, 4, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for specifying an operational state of first and second logical gateways, the method comprising:

receiving a message from the first gateway that indicates the first gateway has transitioned from a standby state to an active state, the first and second gateways (i) serving as a pair of high availability (HA) logical gateways of a logical network implemented on a physical network and (ii) connecting the logical network to a network external to the logical network;

determining that the second gateway is in the active state when the first gateway is in the active state;

determining that the first and second gateways do not communicate with each other; and based on the determination that the first and second gateways do not communicate with each other, directing the first gateway to transition back to the standby state.

2. The method of claim 1, wherein the pair of HA gateways forwards north-south traffic for the logical network.

3. The method of claim 2, wherein an active gateway forwards the north-south traffic for the logical network and a standby gateway takes over the forwarding of the north-south traffic when the active gateway becomes unavailable.

4. The method of claim 2, wherein the forwarding of network traffic comprises performing layer three routing of network traffic to connect the logical network to one or more external networks.

5. The method of claim 1, wherein the first and second gateways comprise virtual machines executing on different host machines.

6. The method of claim 1, wherein the first and second gateways communicate with each other through a set of private links in order to monitor states of each other.

7. The method of claim 1, wherein the message is a first message, wherein determining that the first and second gateways do not communicate with each other comprises receiving a second message from the first gateway that indicates the first and second gateways are disconnected.

8. The method of claim 7, wherein the first gateway sends the second message when the first gateway sends a third message to the second gateway and does not receive an acknowledgement back from the second gateway within a specified period.

9. The method of claim 8, wherein the third message comprises a bidirectional forwarding detection (BFD) message.

10. The method of claim 1, wherein the message is a first message, wherein directing the first gateway to transition back to the first state comprises sending a second message to the first gateway instructing the first gateway to move back into a standby state.

11. A non-transitory machine readable medium, storing a program, which when implemented by at least one processing unit specifies an operational state of first and second logical gateways, the program comprising sets of instructions for:

receiving a message from the first gateway that indicates the first gateway has transitioned from a standby state to an active state, the first and second gateways (i) serving as a pair of high availability (HA) logical gateways of a logical network implemented on a physical network and (ii) connecting the logical network to a network external to the logical network;

determining that the second gateway is in the active state when the first gateway is in the active state;

determining that the first and second gateways do not communicate with each other; and based on the determination that the first and second gateways do not communicate with each other, directing the first gateway to transition back to the standby state.

12. The non-transitory machine readable medium of claim 11, wherein the pair of HA gateways forwards north-south traffic for the logical network.

13. The non-transitory machine readable medium of claim 12, wherein an active gateway forwards the north-south traffic for the logical network and a standby gateway takes over the forwarding of the north-south traffic when the active gateway becomes unavailable.

14. The non-transitory machine readable medium of claim 12, wherein the forwarding of network traffic comprises performing layer three routing of network traffic to connect the logical network to one or more external networks.

15. The non-transitory machine readable medium of claim 11, wherein the first and second gateways comprise virtual machines executing on different host machines.

16. The non-transitory machine readable medium of claim 11, wherein the first and second gateways communicate with each other through a set of private links in order to monitor states of each other.

17. The non-transitory machine readable medium of claim 11, wherein the message is a first message, wherein the set of instructions for determining that the first and second gateways do not communicate with each other comprises a set of instructions for receiving a second message from the first gateway that indicates the first and second gateways are disconnected.

18. The non-transitory machine readable medium of claim 17, wherein the first gateway sends the second message when the first gateway sends a third message to the second gateway and does not receive an acknowledgement back from the second gateway within a specified period.

19. The non-transitory machine readable medium of claim 18, wherein the third message comprises a bidirectional forwarding detection (BFD) message.

20. The non-transitory machine readable medium of claim 11, wherein the message is a first message, wherein the set of instructions for directing the first gateway to transition back to the first state comprises a set of instructions for sending a second message to the first gateway instructing the first gateway to move back into a standby state.

* * * * *